US008468440B2

(12) United States Patent
Flake et al.

(10) Patent No.: US 8,468,440 B2
(45) Date of Patent: *Jun. 18, 2013

(54) LOOK AHEAD OF LINKS/ALTER LINKS

(75) Inventors: Gary W. Flake, Bellevue, WA (US);
William H. Gates, III, Redmond, WA (US); Roderick A. Hyde, Redmond, WA (US); Edward K. Y. Jung, Bellevue, WA (US); Royce A. Levien, Lexington, MA (US); Robert W. Lord, Seattle, WA (US); Richard F. Rashid, Redmond, WA (US); Clarence T. Tegreene, Bellevue, WA (US); Charles Whitmer, North Bend, WA (US); Lowell L. Wood, Jr., Bellevue, WA (US); John D. Rinaldo, Jr., Bellevue, WA (US); Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1036 days.

This patent is subject to a terminal disclaimer.

(21) Appl. No.: 12/154,436

(22) Filed: May 22, 2008

(65) Prior Publication Data

US 2009/0164504 A1    Jun. 25, 2009

Related U.S. Application Data

(63) Continuation-in-part of application No. 12/154,148, filed on May 20, 2008, and a continuation-in-part of application No. 12/074,855, filed on Mar. 6, 2008, and a continuation-in-part of application No. 12/005,637, filed on Dec. 27, 2007, now abandoned, and a continuation-in-part of application No. 12/005,064, filed on Dec. 21, 2007, now abandoned.

(51) Int. Cl.
*G06F 17/00*    (2006.01)

(52) U.S. Cl.
USPC ............................................. 715/200; 715/273

(58) Field of Classification Search
USPC .................................................... 715/200, 273
See application file for complete search history.

(56) References Cited

U.S. PATENT DOCUMENTS

| 5,619,710 | A  | * | 4/1997 | Travis et al. | ............... | 709/203 |
| 6,125,387 | A  | * | 9/2000 | Simonoff et al. | ............. | 709/218 |
| 6,353,850 | B1 | * | 3/2002 | Wies et al. | ................... | 709/203 |

(Continued)

FOREIGN PATENT DOCUMENTS

WO    WO2007/106185    9/2007

OTHER PUBLICATIONS

Garfinkel et al., A Virtual Machine Introspection Based Architecture for Intrusion Detection, Google 2003, pp. 1-16.*

(Continued)

*Primary Examiner* — Cong-Lac Huynh
(74) *Attorney, Agent, or Firm* — Suiter Swantz pc llo

(57) ABSTRACT

A computationally-implemented method comprising retrieving at least a portion of data from a data source, determining an effect of the data, determining an acceptability of the effect of the data at least in part via a virtual machine representation of at least a part of a real machine having one or more end-user specified preferences and providing at least one data display option based on the determining acceptability of the effect of the data.

45 Claims, 26 Drawing Sheets

U.S. PATENT DOCUMENTS

| | | | |
|---|---|---|---|
| 6,424,979 B1 * | 7/2002 | Livingston et al. | 715/206 |
| 6,510,458 B1 | 1/2003 | Berstis et al. | |
| 6,572,662 B2 * | 6/2003 | Manohar et al. | 715/273 |
| 6,665,659 B1 * | 12/2003 | Logan | 1/1 |
| 6,850,252 B1 | 2/2005 | Hoffberg | |
| 6,990,590 B2 * | 1/2006 | Hanson et al. | 713/194 |
| 7,069,562 B2 * | 6/2006 | Kushnirskiy et al. | 719/328 |
| 7,181,744 B2 * | 2/2007 | Shultz et al. | 718/104 |
| 7,188,216 B1 * | 3/2007 | Rajkumar et al. | 711/118 |
| 7,730,190 B2 * | 6/2010 | Coile et al. | 709/227 |
| 7,818,215 B2 * | 10/2010 | King et al. | 705/26.1 |
| 7,920,714 B2 * | 4/2011 | O'Neil | 382/100 |
| 2002/0095411 A1 * | 7/2002 | Caldwell et al. | 707/5 |
| 2002/0174185 A1 * | 11/2002 | Rawat et al. | 709/206 |
| 2003/0009495 A1 | 1/2003 | Adjaoute | |
| 2003/0014659 A1 | 1/2003 | Zhu | |
| 2003/0172050 A1 | 9/2003 | Decime et al. | |
| 2004/0073924 A1 * | 4/2004 | Pendakur | 725/46 |
| 2004/0122856 A1 * | 6/2004 | Clearwater | 707/104.1 |
| 2005/0050222 A1 | 3/2005 | Packer | |
| 2005/0060365 A1 * | 3/2005 | Robinson et al. | 709/203 |
| 2005/0278333 A1 | 12/2005 | Daniels et al. | |
| 2006/0031505 A1 | 2/2006 | Ashley | |
| 2006/0047663 A1 | 3/2006 | Rail | |
| 2006/0059091 A1 * | 3/2006 | Wang et al. | 705/50 |
| 2006/0072724 A1 * | 4/2006 | Cohen et al. | 379/93.25 |
| 2006/0101514 A1 | 5/2006 | Milener et al. | |
| 2006/0206715 A1 * | 9/2006 | Cowan et al. | 713/176 |
| 2006/0259592 A1 | 11/2006 | Angeline | |
| 2006/0271395 A1 | 11/2006 | Harris et al. | |
| 2007/0053513 A1 | 3/2007 | Hoffberg | |
| 2007/0067775 A1 | 3/2007 | Shultz et al. | |
| 2007/0271610 A1 | 11/2007 | Grobman | |
| 2007/0288589 A1 * | 12/2007 | Chen et al. | 709/217 |
| 2007/0294689 A1 | 12/2007 | Garney | |
| 2008/0004802 A1 * | 1/2008 | Horvitz | 701/209 |
| 2008/0005264 A1 | 1/2008 | Brunell et al. | |
| 2008/0046592 A1 * | 2/2008 | Gilhuly et al. | 709/239 |
| 2008/0133540 A1 | 6/2008 | Hubbard et al. | |
| 2008/0155602 A1 * | 6/2008 | Collet et al. | 725/46 |
| 2008/0199042 A1 * | 8/2008 | Smith | 382/100 |
| 2008/0244579 A1 | 10/2008 | Muller | |
| 2008/0289023 A1 | 11/2008 | Wardrop | |
| 2008/0307066 A1 * | 12/2008 | Amidon et al. | 709/217 |
| 2009/0024592 A1 * | 1/2009 | Lazarski et al. | 707/3 |
| 2009/0164924 A1 | 6/2009 | Flake et al. | |
| 2009/0164992 A1 | 6/2009 | Flake et al. | |
| 2009/0164993 A1 | 6/2009 | Flake et al. | |
| 2009/0165134 A1 | 6/2009 | Flake et al. | |
| 2009/0319462 A1 * | 12/2009 | Tirpak et al. | 706/47 |
| 2011/0016468 A1 * | 1/2011 | Singh | 718/1 |
| 2011/0033080 A1 * | 2/2011 | King et al. | 382/100 |
| 2011/0041084 A1 | 2/2011 | Karam | |
| 2011/0228791 A1 * | 9/2011 | Flinta et al. | 370/401 |
| 2012/0054367 A1 * | 3/2012 | Ramakrishnan et al. | 709/242 |
| 2012/0208510 A1 * | 8/2012 | Engstrom et al. | 455/414.1 |

OTHER PUBLICATIONS

Diamadis et al., Efficient Cooperative Searching on the Web: System Design and Evaluation, Google 2004, pp. 699-724.*

Anderson, Integrating Open Hypermedia Systems with the World Wide Web, ACM 1997, pp. 1-10.*

Wade Roush, VMware Flaw Shows Virtualized Systems Aren't Necessarily More Secure, Boston Firm Argues, Feb. 27, 2008, p. 3, Publisher: http://www.xconomy.com/boston/2008/02/27/vmware-flaw-shows-virtualized-systems-arent-necessari . . . , Published in: US.

Wade Roush, Microsoft Delivers Surprise Early Challenge to WMware, Dec. 14, 2007, p. 2, Publisher: http://www.xconomy.com/boston/2007/12/14/microsoft-deliver-surprise-early-challenge-to-vmware/, Published in: US.

Wade Roush, New VMware Acquisition Thinstall Helps Companies Say Goodbye to Installing Windows Software, Jan. 15, 2008, p. 3, Publisher: http://www.xconomy.com/boston/2008/01/15/new-vmware-acquisition-thinstall-helps-companies-say- . . . , Published in: US.

Erik Mellgren, VMware Sees Sweet Future for B-hive, May 29, 2008, p. 3, Publisher: http://www.xconomy.com/boston/2008/05/29/vmware-sees-sweet-futre-for-b-hive/, Published in: US.

Wade Roush, VMware Feeling Pressure as Virtualization Becomes a Commodity, Nov. 14, 2007, p. 4, Publisher: http:/www.xconomy.com/boston/2007/11/14/vmware-feeling-pressure-as-virtualization-becom es-a-co . . . , Published in: US.

Erik Mellgren, Battery Ventures Invests in 'Endpoint Virtualization' Company Neocleus, Jun. 18, 2008, p. 2, Publisher: www.xconomy.com/boston/2008/06/18/battery-ventures-invests-in-endpoint-virtualization-comp . . . , Published in: US.

Garfinkel et al.; "A Virtual Machine Introspection Based Architecture for Intrusion Detection"; In Proc. Network and Distributed Systems Security Symposium; bearing a date of 2003 and printed on Feb. 3, 2012; pp. 191-206.

"VMware Virtual SMP"; VMware, Inc.; bearing a date of 2007; 1 page; located at www.vmware.com.

Zhang et al.; "The Role of URLs in Objectionable Web Content Categorization"; Proceedings of the 2006 IEEE/WIC/ACM International Conference on Web Intelligence; bearing a date of 2006; 7 pages; IEEE.

* cited by examiner

210 retrieving at least a portion of data from a data source 220 determining a content of the data 230 determining an acceptability of an effect of the content of the data at least in part via a virtual machine representation of at least a part of a real machine having one or more end-user specified preferences 402 determining an acceptability of an effect of the content of the data at least in part via a virtual machine representation of at least a part of a real machine having one or more end-user specified preferences by issuing a request to a remote computer for additional data information 404 determining an acceptability of an effect of the content of the data at least in part via a virtual machine representation of at least a part of a real machine having one or more end-user specified preferences by determining whether data references additional data when loading 406 determining an acceptability of an effect of the data at least in part via a virtual machine representation of at least a part of a real machine having one or more end-user specified preferences by issuing a request to a remote computer for additional data information 408 determining an acceptability of an effect of the content of the data at least in part via a virtual machine representation of at least a part of a real machine having one or more end-user specified preferences by examining a copy of data from a location geographically distinct from a location of the data 410 generating a substantial duplicate of at least a part of a real machine at a location geographically distinct from a location of the data 240 providing at least one data display option based on the determining acceptability of the effect of the content of the data

FIG. 4

LOOK AHEAD OF LINKS/ALTER LINKS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed 21 Dec. 2007, application Ser. No. 12/005,064 now abandoned, or is an application of which a currently co-pending application is entitled to the benefit of the filing date.
2. For purposes of the USPTO extra-statutory requirements, the present application constitutes a continuation-in-part of U.S. patent application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed Dec. 27, 2007, application Ser. No. 12/005,637 now abandoned, or is an application of which a currently co-pending application is entitled to the benefit of the filing date.
3. For purposes of the USPTO extra-statutory requirements, the present application constitutes a continuation-in-part of U.S. patent application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed Mar. 6, 2008, application Ser. No. 12/074,855, which is currently co-pending, or is an application of which a currently co-pending application is entitled to the benefit of the filing date.
4. For purposes of the USPTO extra-statutory requirements, the present application constitutes a continuation-in-part of U.S. patent application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed May 20, 2008, Ser. No. 12/154,148, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

BACKGROUND

Web sites often contain links to other web sites enabling a user to navigate from one web site to another. Certain links may contain data that may compromise security and/or privacy. Certain links may contain data that a user may not desire to view.

SUMMARY

A computationally implemented method includes, but is not limited to: retrieving at least a portion of data from a data source; determining a content of the data; determining an acceptability of an effect of the content of the data at least in part via a virtual machine representation of at least a part of a real machine having one or more end-user specified preferences; and providing at least one data display option based on the determining acceptability of the effect of the content of the data. In addition to the foregoing, other computationally implemented method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for retrieving at least a portion of data from a data source; means for determining a content of the data; means for determining an acceptability of an effect of the content of the data at least in part via a virtual machine representation of at least a part of a real machine having one or more end-user specified preferences; and means for providing at least one data display option based on the determining acceptability of the effect of the content of the data. In addition to the foregoing, other system aspects are described in the claims, drawings, and text forming a part of the present disclosure.

A computationally implemented system includes, but is not limited to: circuitry for retrieving at least a portion of data from a data source; circuitry for determining a content of the data; circuitry for determining an acceptability of an effect of the content of the data at least in part via a virtual machine representation of at least a part of a real machine having one or more end-user specified preferences; and circuitry for providing at least one data display option based on the determining acceptability of the effect of the content of the data. In addition to the foregoing, other system aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 illustrates an alternative embodiment of the operational flow of FIG. 2.

DETAILED DESCRIPTION

Figure 1A:
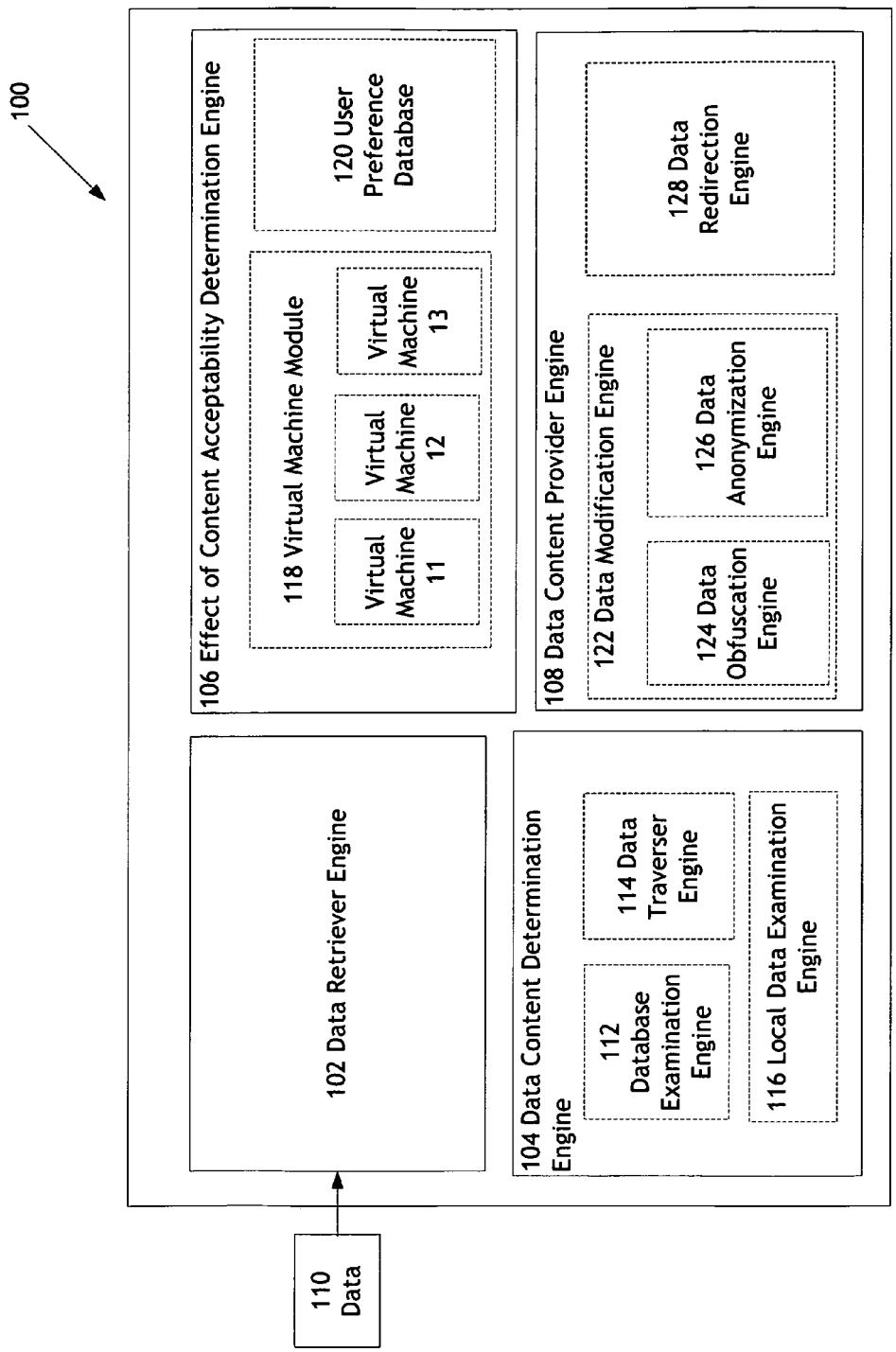
FIG. 1A illustrates an exemplary environment in which one or more technologies may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Referring to FIG. 1A, a system 100 related to looking ahead for data is illustrated. The system 100 may include a data retriever engine 102, a data content determination engine 104, an Effect of content acceptability determination engine 106, and a data provider engine 108. Data content determination engine 104 may include a database examination engine 112, a data traverser engine 114, and a local data examination engine 116. Effect of content acceptability determination engine 106 may include a virtual machine module 118 including one or more virtual machines 11, 12, and 13 and a user preference database 120. Data content provider engine 108 may include a data modification engine 122 that may further include a data obfuscation engine 124 and a data anonymization engine 126. Data content provider engine 108 may also include a data redirection engine 128.

Figure 1B:
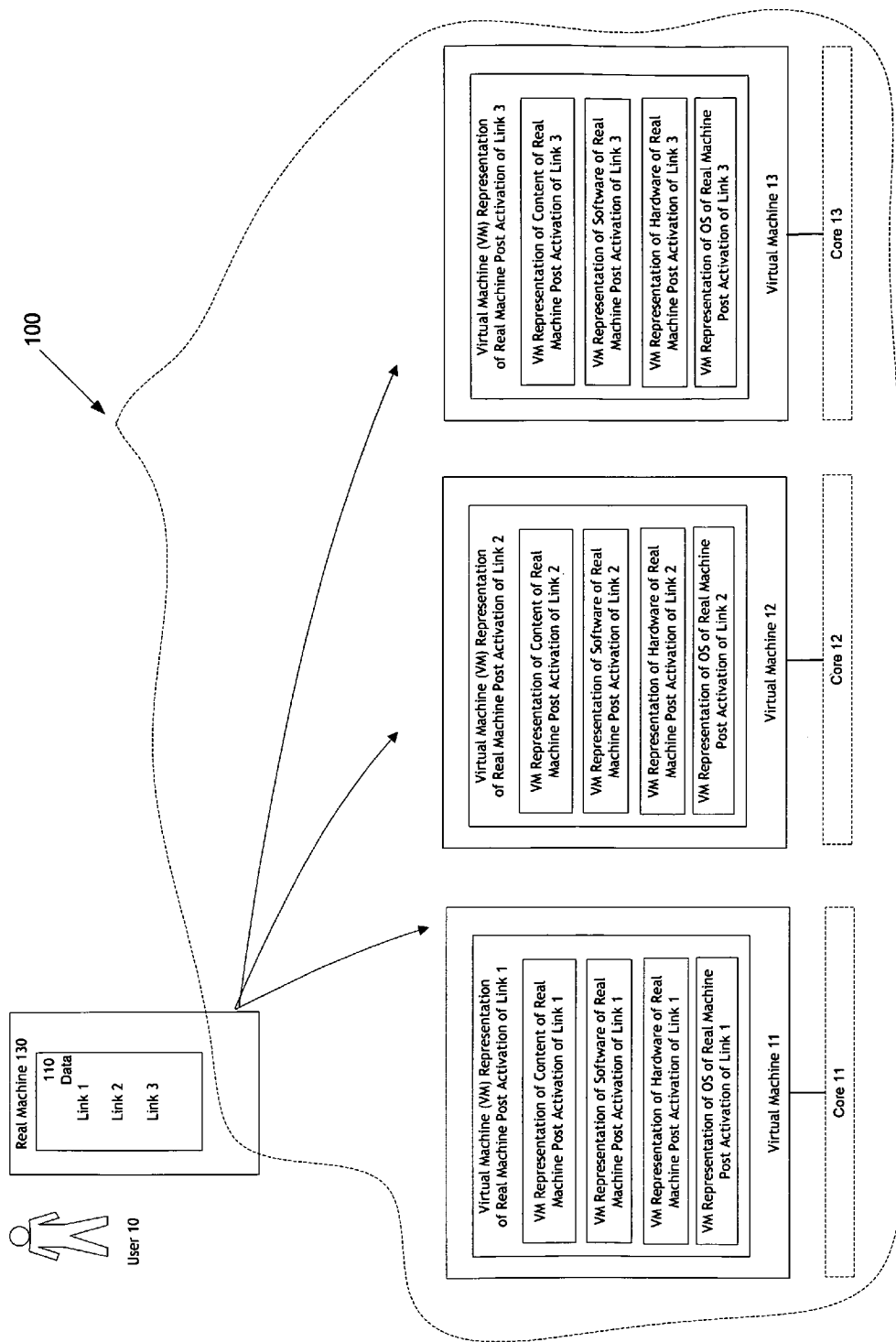
FIG. 1B illustrates an operational view of a real machine in which at least a portion of the system illustrated in FIG. 1A has been implemented.

FIG. 1B shows an operational view of real machine 130 (e.g., a desktop, notebook, or other type computing system, including or excluding one or more peripheral devices) in which at least a portion of system 100 (FIG. 1A) has been implemented. In some instances, system 100 is at least partially implemented in a single core processor at least partially resident within real machine 130 (e.g., one or more virtual machines of virtual machine module 118 at least partially implemented on a single-core processor of real machine 130). In other instances, system 100 is at least partially implemented in a multi-core processor at least partially resident within real machine 130 (e.g., one or more virtual machines of virtual machine module 118 at least partially respectively implemented on one or more cores of a multi-core processor of real machine 130). In other instances, system 100 is at least partially implemented in a single-core processor at least partially non-resident within real machine 130 (e.g., one or more virtual machines of virtual machine module 118 at least partially implemented on a single-core processor of a hosting site/machine/system physically distal from real machine 130). In other instances, system 100 is at least partially implemented in a multi-core processor at least partially non-resident within real machine 130 (e.g., one or more virtual machines of virtual machine module 118 at least partially respectively implemented on one or more cores of a multi-core processor of a hosting site/machine/system physically distal from real machine 130).

FIG. 1B depicts real machine 130 containing data 110 (e.g., a Web page) containing Link 1, Link 2, and Link 3. FIG. 1B illustrates an example in which at least a part of system 100 traverses Link 1, Link 2, and Link 3 of data 110 via virtual machine representations of real machine 130. In some instances, such virtual machine traversals are utilized to prospectively determine what might happen should real machine 130 be used to traverse such links. For example, determining how such traversal(s) might compare to one or more user-associated preferences of real machine 130 (e.g., that user 10 prefers to visit sites having content acceptable to a defined organization, such a government; that user 10 prefers not to visit sites having malware or spyware; that user 10 prefers not to visit sites that reset real machine hardware options (e.g., audio/visual peripherals); that user 10 prefers not to visit sites that reset real machine software options (e.g., proxy servers); etc.). User-associated preferences of real machine 130 may be stored in user preference database 120 (FIG. 1A) of Effect of content acceptability determination engine 106 (FIG. 1A). User preference database 120 may contain user preferences with respect to content of the real machine 130, hardware of the real machine 130, software of the real machine 130 and an operating system of the real machine. User preference database 120 may be in communication with virtual machine module 118 (FIG. 1A). Specifically, virtual machine module 118 (FIG. 1A) may receive user preference database information from user preference database 120 (FIG. 1A) and spawn a copy of at least a portion of user preference database 120 (FIG. 1A) on each of virtual machines 11, 12 and/or 13.

FIG. 1B illustrates virtual machine 11. Virtual machine 11 may be illustrated as included in virtual machine module 118 (FIG. 1A) of Effect of content acceptability determination engine 106 (FIG. 1A). FIG. 1B shows virtual machine 11 encompassing a virtual machine representation of real machine 130, post (e.g. subsequent to) activation of Link 1 (e.g., as at least a part of real machine 130 would exist had link 1 actually been traversed on real machine 130). FIG. 1B depicts virtual machine 11 including a virtual machine representation of the content of the real machine 130 post activation of Link 1. Examples of such content include a movie, music file, a script (e.g., Java script or Active X control), a markup language, an email, etc. downloaded onto real machine 130 from one or more sources associated with activation/traversal of Link 1.

FIG. 1B also illustrates virtual machine 11 including a virtual machine representation of software (e.g., a state of software) of the real machine 130 post (e.g. subsequent to) activation of Link 1. Examples of such software might include a commercial word processing program or suite of programs (e.g. Microsoft® Office for Windows), an open source Web browser (e.g., Mozilla's Firefox® Browser), an AJAX mash up (e.g., an executing JavaScript™ and/or data retrieved by same via an XML-like scheme), or a commercial database management system (e.g., one or more of Oracle Corporation's various products), a commercial anti-malware/spyware programs (e.g., such as those of Symantec Corporation or McAfee,Inc.), etc.

FIG. 1B also illustrates virtual machine 11 including a virtual machine representation of hardware (e.g. a state of the hardware) of the real machine 130 post activation of Link 1. Examples of such hardware might include all or part of a chipset (e.g., data processor and/or graphics processor chipsets such as those of Intel Corporation and/or NvidiaCorporation), a memory chip (e.g., flash memory and/or random access memories such as those of Sandisk Corporation and/or Samsung Electronics, Co., LTD), a data bus, a hard disk (e.g., such as those of Seagate Technology, LLC), a network adapter (e.g., wireless and/or wired LAN adapters such as those of Linksys and/or CiscoTechnology, Inc.), printer, a removable drive (e.g., flash drive), a cell phone, etc.

FIG. 1B also illustrates virtual machine 11 including a virtual machine representation of an operating system (e.g., a state of an operating system and/or network operating system) of the real machine 130 post activation of Link 1. Examples of such an operating system might include a computer operating system (e.g., e.g. Microsoft® Windows 2000, Unix, Linux, etc) and/or a network operating system (e.g., the Internet Operating System available from Cisco Technology, Inc. Netware® available from Novell, Inc., and/or Solaris available from Sun Microsystems, Inc.).

FIG. 1B also illustrates that virtual machine 11 may run on core 11 of a multi-core processor. In addition to the herein, those skilled in the art will appreciate that the virtual machine representations discussed herein are not limited to specific examples described, but instead include any components of real machine 130 as such might be understood in the art. Examples of the foregoing would include firmware, logic associated with display units, logic associated with robotics, application specific integrated circuits, etc.

As noted, in some instances system 100 may traverse (e.g. view) links of data 110 via one or virtual machine representations of at least a part of real machine 130. Accordingly, FIG. 1B shows virtual machine 12 encompassing a virtual machine representation of real machine 130 (e.g., one or more states of one or more components associated with real machine 130), post activation of Link 2. FIG. 1B depicts virtual machine 12 at least partly running on core 12 of a multi-core processor. Virtual machine module 118 (FIG. 1A) of Effect of content acceptability determination engine 106 (FIG. 1A) may be illustrated to include virtual machine 12.

FIG. 1B also illustrates virtual machine 12 may include a virtual machine representation of content (e.g. a video) of real machine 130 post activation of Link 2, a virtual machine representation of software (e.g. Microsoft Office for Windows) of real machine 130 post activation of Link 2, a virtual machine representation of hardware (e.g. the circuitry or processor of the real machine) of real machine 130 post activation of Link 2, and a virtual machine representation of operating system (e.g. Microsoft Windows 2000, XP, Vista) of real machine 130 post activation of Link 2.

As noted, in some instances system 100 may traverse links of data 110 via one or more virtual machine representations of at least a part of real machine 130. Accordingly, FIG. 1B shows virtual machine 13 encompassing a virtual machine representation of real machine 130, post activation of Link 3 (e.g., representative of one or more states of one or more hardware/software/firmware components of/resident within real machine 130). The foregoing constitutes one example of how system 100 may use virtual machine 13 to traverse Link 3 (e.g. a link relating to a list of or links to information on architectural building styles). Virtual machine module 118 (FIG. 1A) of Effect of content acceptability determination engine 106 (FIG. 1A) may include virtual machine 13. FIG. 1B further illustrates virtual machine 13 may include a virtual machine representation of the content (e.g. a markup language) of the real machine 130 post activation of Link 3, a virtual machine representation of the software (e.g. Unix) of the real machine 130 post activation of Link 3, a virtual machine representation of the hardware (e.g. a hard disk) of the real machine 130 post activation of Link 3, and a virtual machine representation of the operating system (e.g. Solaris Operating System) of the real machine 130 post activation of Link 3. FIG. 1B shows that virtual machine 13 may be run on core 13 of a multi-core processor.

Upon traversal of links 1, 2, and 3 by virtual machines 11, 12, and 13, respectively, each of virtual machines 11, 12, and 13 may determine whether an effect of the data content is acceptable to a user based on a user's preferences. Virtual machines 11, 12 and/or 13 may compare the traversed data to one or more user preferences stored in a user preference database 120 (FIG. 1A). User preference database information may be communicated to virtual machine module 118 (FIG. 1A) and a copy of at least a portion of user preference database 120 may be spawned (e.g. generated) on each virtual machines 11, 12 and/or 13. Virtual machines 11, 12, and 13 may communicate the results of a respective comparison of activation of a link (e.g. loading at least a portion of a link's content onto a virtual machine 11, 12 and/or 13) to a user preference (e.g. a preference not to load malware onto a user's real machine) to virtual machine module 118 (FIG. 1A). Virtual machine module 118 (FIG. 1A) may communicate the results of a comparison of activation of a link to a user preference to effect of content acceptability determination engine 106 (FIG. 1A). Effect of content acceptability determination engine 106 may communicate the comparison to the data content provider engine 108 (FIG. 1A). The data content provider engine 108 may then provide the results (e.g. one or more weblinks approved for viewing) to a real machine 130 (e.g. a computing device with or without associated peripherals) that may be viewable to a user 10 on a display.

Figure 1C:
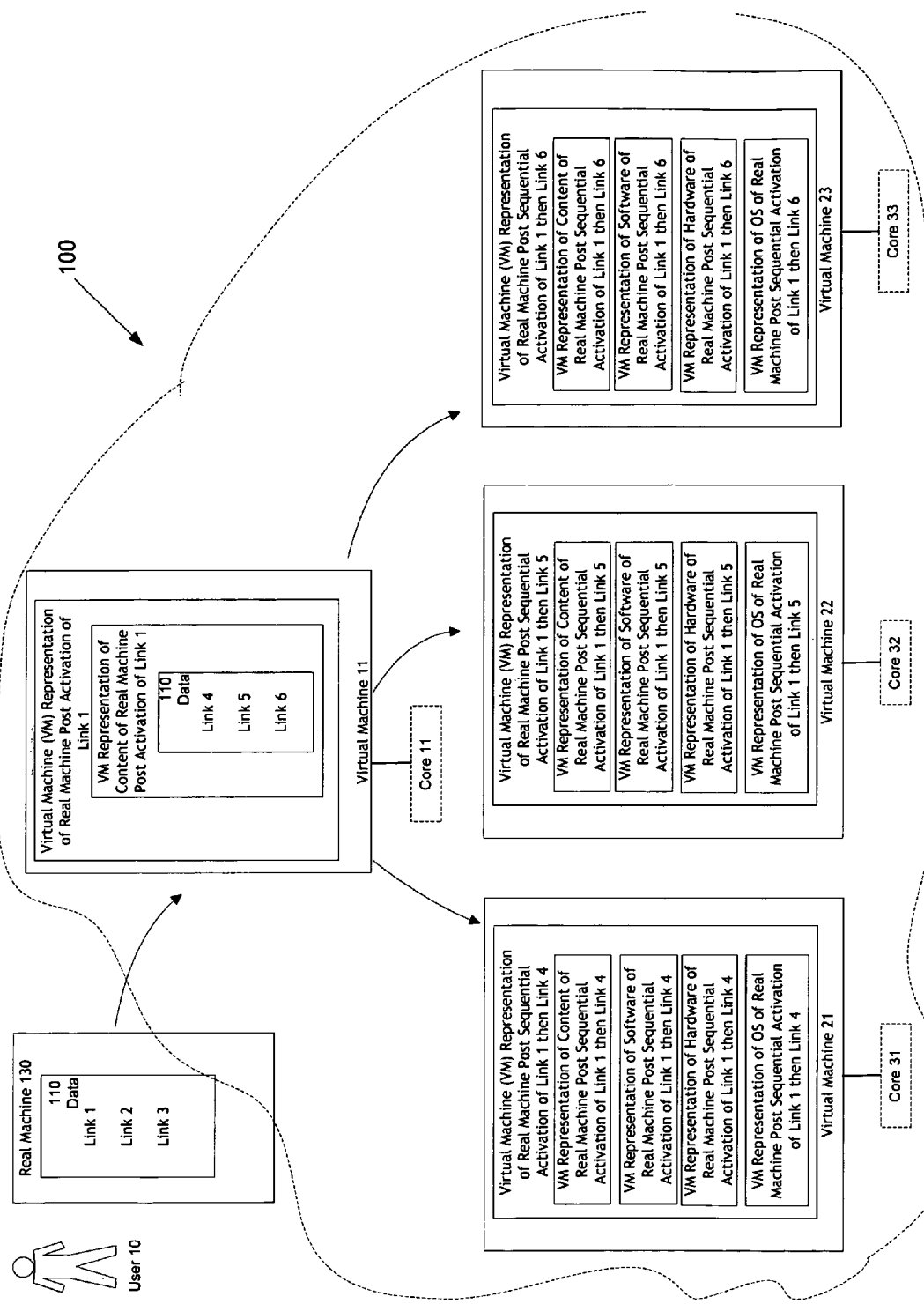
FIG. 1C illustrates an operational view of a real machine in which at least a portion of the system illustrated in FIG. 1A has been implemented.

FIG. 1C shows a partial follow-on operational view of real machine 130 (e.g., a desktop, notebook, or other type computing system) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1. In the example shown, the content is depicted as data 110 having Link 4, Link 5 and Link 6. As a specific example, data 110 could be a Web page containing embedded Link 4 to an advertisement, Link 5 to a video file, and Link 6 to a still image file.

In some instances, system 100 may use additional virtual machine representations of at least a part of real machine 130 to prospectively traverse Link 4, Link 5, and Link 6. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

Upon traversal of links 4, 5, and 6 by virtual machines 21, 22, and 23, respectively, each of virtual machines 21, 22, and 23 may determine whether an effect of the data content is acceptable to a user based on a user's preferences. Virtual machines 21, 22, and 23 may compare the traversed data to one or more user preferences stored in a user preference database 120 (FIG. 1A). As previously described, user preference database information may be communicated to virtual machine module 118 (FIG. 1A) and a copy of at least a portion of user preference database 120 may be spawned (e.g. generated) on each virtual machines 11, 12 and/or 13. Virtual machine 11 may then communicate user preference database information to each of virtual machines 21, 22, and 23, and a copy of a user preference database 120 (FIG. 1A) may be spawned on each of virtual machines 21, 22, and 23. Virtual machines 21, 22, and 23 may communicate the results of a respective comparison of activation of a link (e.g. loading at least a portion of a link's content onto a virtual machine 21, 22, and/or 23) to a user preference (e.g. a preference to prevent installation of a rootkit onto a user's real machine) to virtual machine 11. Virtual machine 11 may communicate the results of a comparison to virtual machine module 118 (FIG. 1A). Virtual machine module 118 (FIG. 1A) may communicate the results of a comparison of activation of a link to a user preference to effect of content acceptability determination engine 106 (FIG. 1A). Effect of content acceptability determination engine 106 may communicate the comparison to the data content provider engine 108 (FIG. 1A). The data content provider engine 108 may then provide the results (e.g. one or more weblinks approved for viewing) to a real machine 130 (e.g. a computing device with or without associated peripherals) that may be viewable to a user 10 on a display.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. iC depicts system 100 traversing Link 4 via a virtual machine representation of real machine 130 encompassed within virtual machine 21. Accordingly, FIG. 1C illustrates virtual machine 21 including a virtual machine representation of content (e.g., a movie, web page, music file, etc.) of the real machine 130 post sequential activation of Link 1 then Link 4, a virtual machine representation of the software (e.g.) of the real machine 130 post sequential activation of Link 1 then Link 4, a virtual machine representation of the hardware (e.g. the circuitry or processor of the real machine) of the real machine 130 post sequential activation of Link 1 then Link 4, and a virtual machine representation of the operating system (e.g. Linux) of the real machine 130 post sequential activation of Link 1 then Link 4.

FIG. 1C shows virtual machine 22 encompassing a virtual machine representation of real machine 130 post (e.g., subsequent to) a sequential activation of Link 1 (e.g., as shown on FIG. 1B) then Link 5 (e.g., as shown on FIG. 1C). FIG. 1C depicts that in one instance virtual machine 22 may be run on core 32 of a multi-core processor. FIG. 1C depicts system 100 traversing Link 5 via a virtual machine representation of real machine 130 encompassed within virtual machine 22. Accordingly, FIG. 1C illustrates virtual machine 22 including a virtual machine representation of content (e.g. a graphical image, a text file, an email, etc) of the real machine 130 post (e.g., subsequent to) sequential activation of Link 1 then Link 5, a virtual machine representation of software (e.g. an AJAX mashup) of the real machine 130 post sequential activation of Link 1 then Link 5, a virtual machine representation of hardware (e.g. a network adapter) of the real machine 130 post sequential activation of Link 1 then Link 5, and a virtual machine representation of an operating system (e.g. Mac OS/X) of the real machine 130 post sequential activation of Link 1 then Link 5.

FIG. 1C shows virtual machine 23 may be a virtual machine representation of real machine 130 post (e.g., subsequent to) sequential activation of Link 1 (e.g., FIG. 1B) then Link 6 (e.g., FIG. 1C). FIG. 1C depicts that in one instance virtual machine 23 may be run on core 33 of a multi-core processor. System 100 is shown using virtual machine 23 to traverse Link 6. FIG. 1C further illustrates virtual machine 23 encompassing a virtual machine representation of the content (e.g. a music file) of the real machine 130 post sequential activation of Link 1 then Link 6, a virtual machine representation of the software (e.g. a commercial database management system) of the real machine 130 post sequential activation of Link 1 then Link 6, a virtual machine representation of the hardware (e.g. a removable drive) of the real machine 130 post sequential activation of Link 1 then Link 6, and a virtual machine representation of the operating system (e.g. GNU, Berkeley Software Distribution) of the real machine 130 post sequential activation of Link 1 then Link 6 (e.g., as such might appear after activation of a link installed by a rootkit via malware/spyware).

Those skilled in the art will appreciate that system 100 may generate as many virtual machines as necessary to traverse individual links of interest, and that the examples herein are used for sake of clarity. Those skilled in the art will appreciate that examples used herein are meant to be indicative of the fact that system 100 can run in whole or in part on proximate single or multi-core machines and/or distal single or multi-core machines, on distributed computing systems (e.g., GRID or clustered), on local computing systems, or hosted computing systems, etc.

Figure 1D:
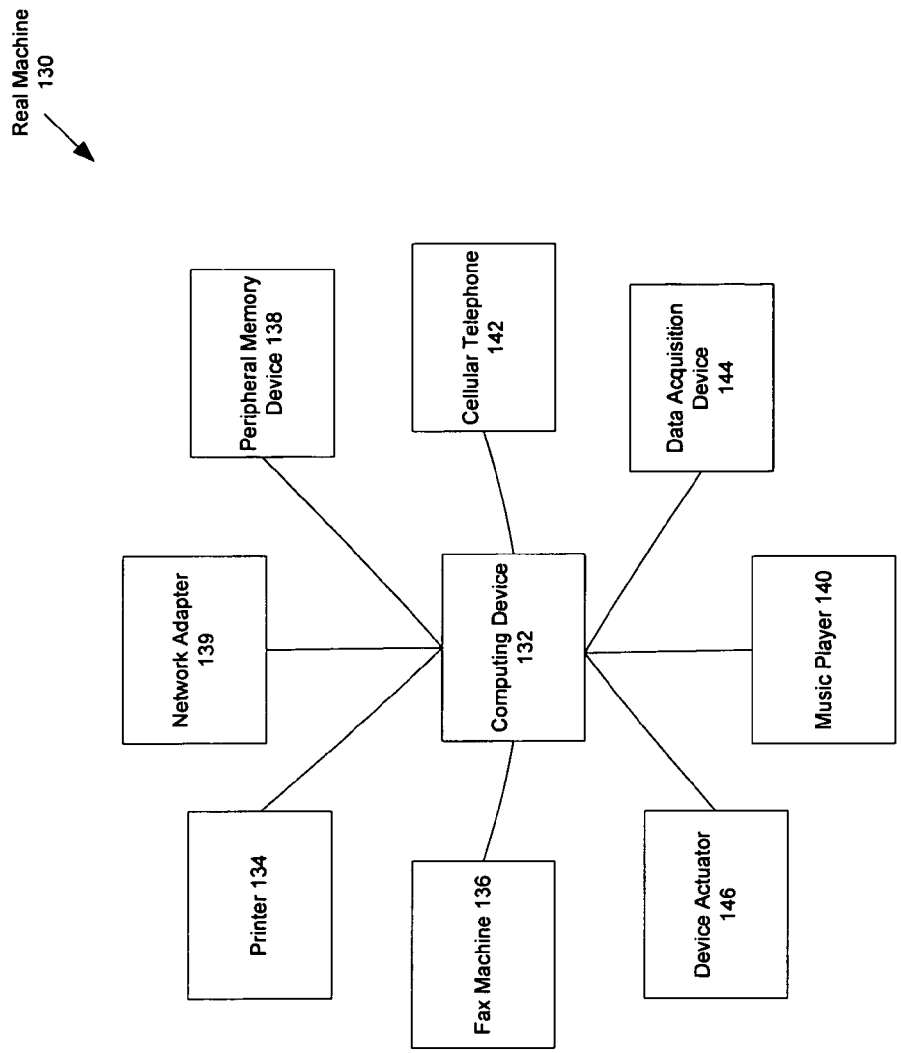
FIG. 1D illustrates an operational view of a real machine in which at least a portion of the system illustrated in FIG. 1A has been implemented.

FIG. 1D shows a representative view of an implementation of real machine 130 (e.g., a desktop, notebook, or other type computing system, and/or one or more peripheral devices). FIG. 1D illustrates that implementations of real machine 130 may include all/part of computing device 132 and/or all/part of one or one or more peripherals associated computing device 132. The computing device 132 may be any device capable of processing one or more programming instructions. For example, the computing device 132 may be a desktop computer, a laptop computer, a notebook computer, a mobile phone, a personal digital assistant (PDA), combinations thereof, and/or other suitable computing devices.

As noted, in some instances, real machine 130 may also include at least a portion of one or more peripheral devices connected/connectable (e.g., via wired, waveguide, or wireless connections) to real machine 130. Peripheral devices may include one or more printers 134, one or more fax machines 136, one or more peripheral memory devices 138 (e.g., flash drive, memory stick), one or more network adapters 139 (e.g., wired or wireless network adapters), one or more music players 140, one or more cellular telephones 142, one or more data acquisition devices 144 (e.g. robots) and/or one or more device actuators 146 (e.g., an hydraulic arm, a radiation emitter, or any other component(s) of industrial/medical systems).

Figure 2:
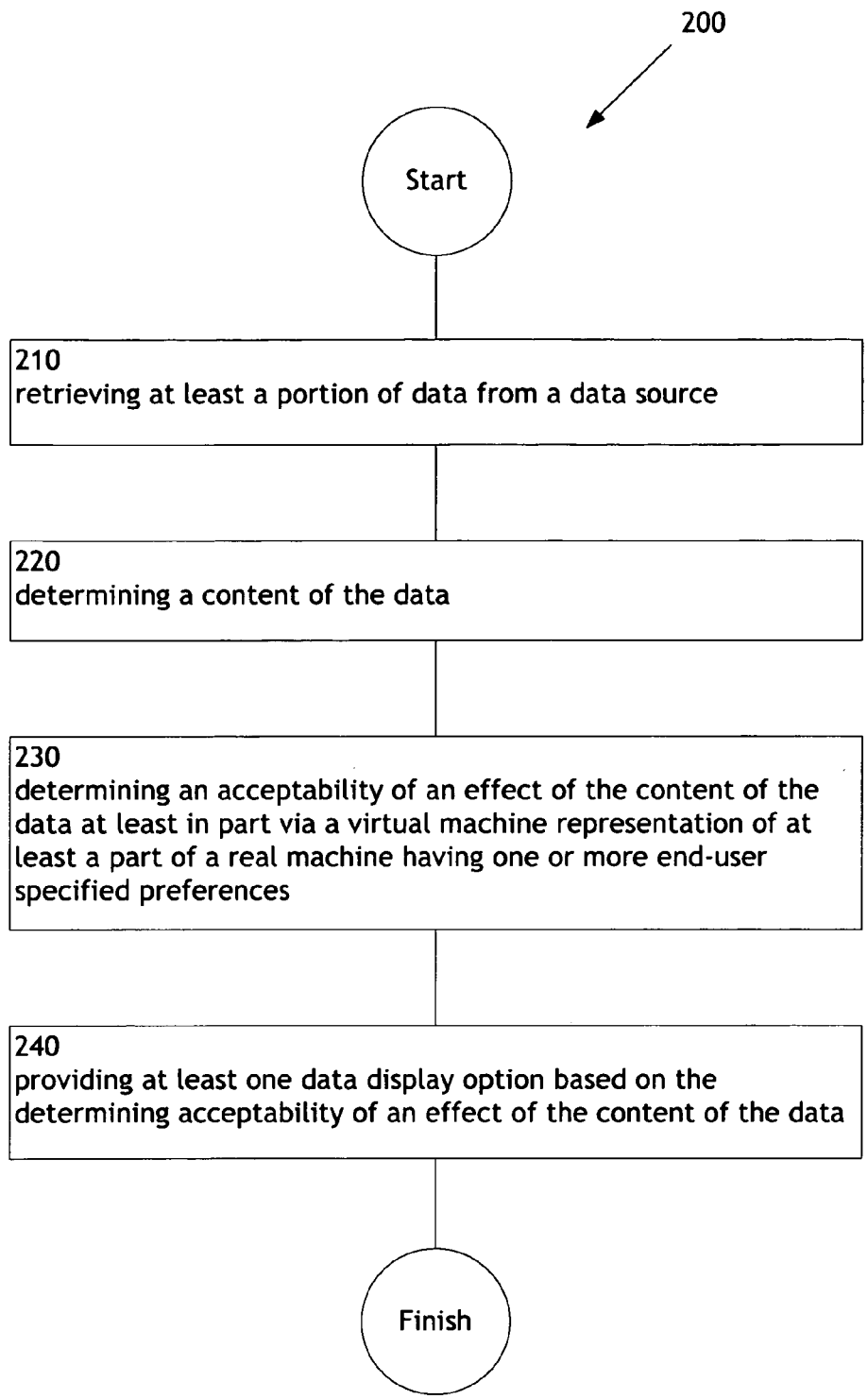
FIG. 2 illustrates an operational flow representing example operations related to providing acceptable data content to a real machine.

FIG. 2 illustrates an operational flow 200 representing example operations related to FIGS. 1A, 1B, 1C and 1D. In FIG. 2 and in following figures that include various examples of operational flows, discussion and explanation may be provided with respect to the above-described examples of FIGS. 1A, 1B, 1C, and 1D and/or with respect to other examples and contexts. However, it should be understood that the operational flows may be executed in a number of other environments and contexts, and/or in modified versions of FIGS. 1A, 1B, 1C, and 1D. Also, although the various operational flows are presented in the sequence(s) illustrated, it should be understood that the various operations may be performed in other orders than those which are illustrated, or may be performed concurrently.

After a start operation, the operational flow 200 shows operation 210, which depicts retrieving at least a portion of data from a data source (e.g. a computer accessible from the internet). For example, FIG. 1A shows a data retriever engine 102. Data retriever engine may retrieve (e.g. download) data 110 (e.g. a web page) from a data source such as a computer accessible from the internet. Specifically, data 110 may be web content retrieved from the world wide web via a computing device accessible from the internet. For example, data retriever engine 102 may set a URL and add a querystring value to the URL. Data retriever engine 102 may then make a request to the URL and scan the response received from the URL. Data 110 may be a web site or web page containing one or more links to additional web sites, such as shown, for example, in FIG. 1B and/or FIG. 1C. Data 110 may in some instances be textual, a two-dimensional or three-dimensional image, audible, or video representations, which in some instances may entail programming code such as html, javascript, C, C++, or any other programming code capable of producing text, visual images, audio content, video content or any combination of text, visual images, audible content and video content.

Then, operation 220 depicts determining a content of the data. FIG. 1A shows a data content determination engine 104. Data content determination engine 104 may determine the content (e.g. text, audio, video, etc.) of the data 110 retrieved from the data source by the data retriever engine 102. For example, FIG. 1A shows that the data content determination engine 104 may include a database examination engine 112, a data traverser engine 114, and a local data examination engine 116. A database examination engine 112 may examine (e.g. scan) a database (e.g. information retrieved from a storage server) of known data (e.g. weblinks) and compare the known data to the data 110 to determine data content (e.g. data types such as text, image, audio and/or video content). Additionally, database examination engine 112 may compare a portion of data 110 (e.g. a data packet header) against a database including a collection of data broken down into its respective components (e.g. header, body). If the comparison yields a reasonable match, the data type may be determined. Data content determination may be transmitted from the database examination engine 112 to the data content determination engine 104.

A data traverser engine 114 may traverse (e.g. parse) at least a portion of the data (e.g. a portion of a web page) to determine data content (e.g. an image or video) within the portion of the data. Data traversal may occur in real time (e.g. simultaneously as data is loading). Data content determination may be transmitted from the data traverser engine 114 to the data content determination engine 104.

A local data examination engine 116 may locally (e.g. on the real machine 130) examine (e.g. analyze) at least a portion of the data (e.g. data packets) to determine data content (e.g. an audio file). For instance, local data examination engine 116 may view an amount of html source code to locate markers signifying the type of data content. Data content determination may be transmitted from the local data examination engine 116 to the data content determination engine 104. Data content determination engine 104 may transmit a data content determination to the Effect of content acceptability determination engine 106. The content of the data 110 may be any textual, audible, or visual content loaded or displayed after the data is retrieved by the data retriever engine 102. For instance, the content of the data 110 may be a web page comprising text, sound, and/or an image, a link to a web page, a video or any combination of text, sound, images, links to web pages, and videos.

Then, operation 230 illustrates determining an acceptability of an effect of the content of the data at least in part via a virtual machine representation of at least a part of a real machine having one or more end-user specified preferences. FIG. 1A illustrates an Effect of content acceptability determination engine 106. Effect of content acceptability determination engine 106 may receive data and an associated data content determination (e.g. data is an audio file) from data content determination engine 104 post retrieval of data by data retriever engine 102 and transfer of retrieved data to data content determination engine 106. Effect of content acceptability determination engine 106 (FIG. 1A) may utilize, for example, virtual machine 12 (FIG. 1A) spawned by virtual machine module 118 to determine whether data associated with Link 2 would result in a change in the operating system of real machine 130 contra to user preferences regarding the operating system as reflected by user preference database 120.

Then, operation 240 shows providing at least one data display option based on the determining acceptability of the effect of the content of the data. FIG. 1A illustrates a data provider engine 108. Data provider engine 108 may be in communication with Effect of content acceptability determination engine 106, which may receive data and an associated data content determination (e.g. data is a video file) from data content determination engine 104 post retrieval of data by data retriever engine 102 and transfer of retrieved data to data content determination engine 104. Effect of content acceptability determination engine 106 may transfer at least effect of content acceptability determination to the data provider engine 108 to provide at least one data display option. In one example, data provider engine 108 (FIG. 1A) provides data via placing the data on a visual display, where the content is such that it meets one or more thresholds associated with the effect of content acceptability determination. Provided data may be a list of web links, a web page, or other data that either have been deemed acceptable by effect of content acceptability determination engine 106 or that have been modified (e.g., obfuscated), such as by data modification engine 122, such that the to-be-displayed content is judged acceptable under user preferences. Provided data may be modified via the data modification engine 122. For instance, provided data may be obfuscated via the data obfuscation engine 124 (e.g., at least a portion of the displayed data may be blurred out or disabled), or provided data may be anonymized via the data anonymization engine 126 (e.g., at least a portion of the data may be deleted entirely). Data content provider engine 108 (FIG. 1A) may receive at least one display instruction (e.g. OK to display links 1 and 2) from at least one component of Effect of content acceptability determination engine 106 (FIG. 1A) for at least a portion of data to be displayed. For instance, each of virtual machines 11, 12, and/or 13 may include one or more instruction generating modules configured to provide an instruction to the Effect of content acceptability determination engine 106 after a comparison of an activation of a link to a user preference stored in a copy of the user preference database 120 (FIG. 1A) spawned on the virtual machine 11, 12, and/or 13. Such instruction may include an instruction to the data content provider engine 108 to prevent the data content provider engine 108 from displaying data that may configure a hardware profile of real machine 130 counter to anti-viral settings stored in the user preference database 120 (FIG. 1A), or an instruction to the data content provider engine 108 to prevent the data content provider engine 108 from displaying data that may configure an operating system of real machine 130 counter to a previous operating system of the real machine (130) (e.g. determine if a rootkit has been installed).

Figure 3:
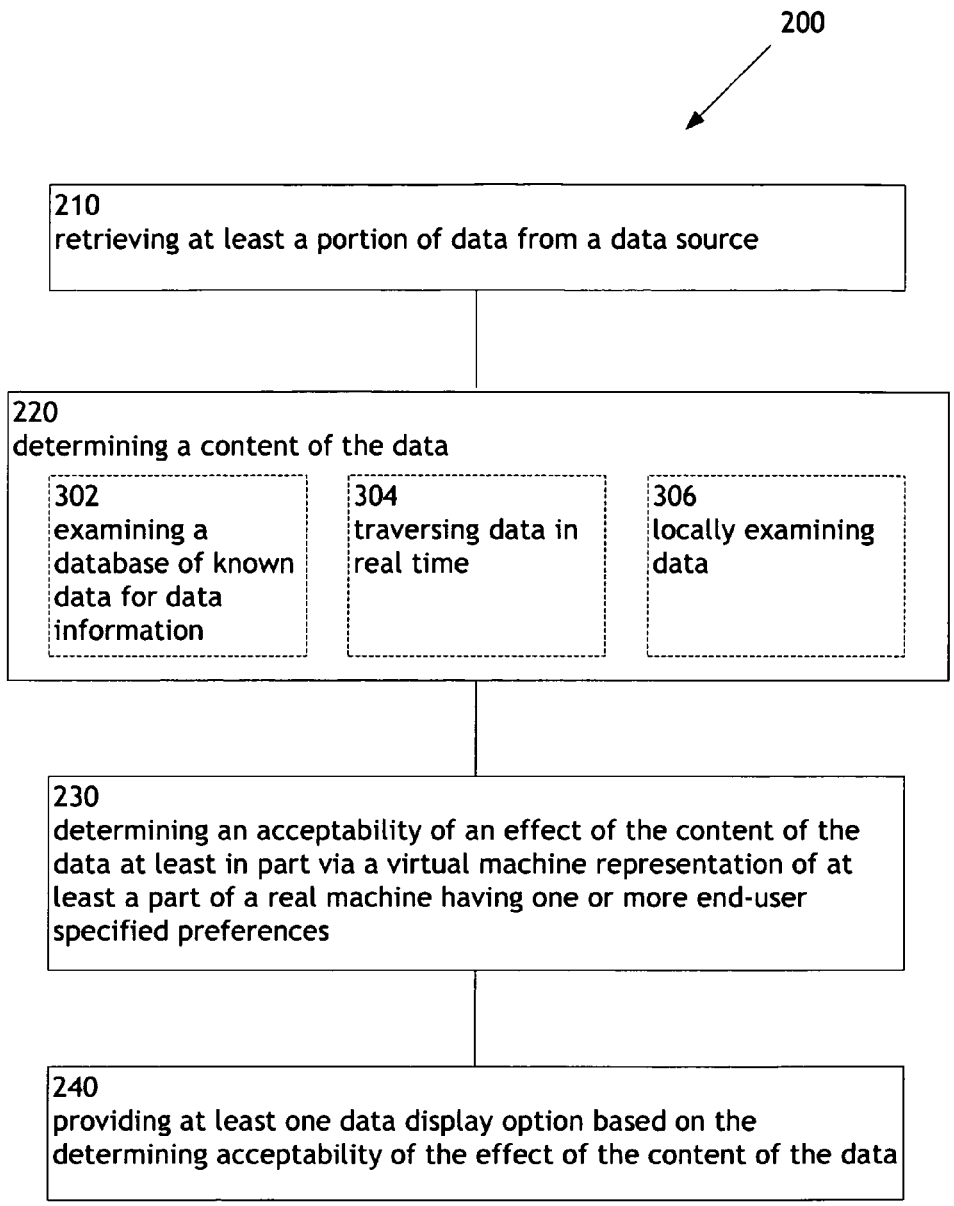
FIG. 3 illustrates an alternative embodiment of the operational flow of FIG. 2.

FIG. 3 illustrates alternative embodiments of the example operational flow 200 of FIG. 2. FIG. 3 illustrates example embodiments where the operation 220 may include at least one additional operation. Additional operations may include an operation 302, an operation 304, and/or an operation 306.

Operation 302 illustrates examining a database of known data for data information. Continuing the example above, data content determination engine 104 (FIG. 1A) may receive data 110 retrieved from a data source by the data retriever engine 102 and communicate data 110 to the database examination engine 112. Database examination engine 112 may be configured to examine a database of data provided, for example, by a data provider service or a database of data stored on a real machine 130. For instance, a database may include a list of links viewed by a user or pre-approved by a user based on one or more user-specified preferences, such as links from a specific source of information (e.g., the Roman Catholic Church). Database examination engine 112 may communicate the results of a database examination to the data content determination engine 104.

Operation 304 shows traversing data in real time. Continuing the example above, database traverser engine 114 (FIG. 1A) examines data received from the data content engine 104 following retrieval of data from the data retriever engine 102. Data traverser engine 114 may be configured to scan the data 110 to determine a data content type (e.g. an image, a video or an audio file). Database traverser engine 114 may communicate the results of a data traversal to the data content determination engine 104.

Operation 306 depicts locally examining data. For instance, continuing the example above, data content determination engine 104 (FIG. 1A) may receive data 110 retrieved from a data source (e.g. a computer accessible through the internet) by the data retriever engine 102 and communicate data 110 to the local data examination engine 116. The local examination engine 116 may examine the data 110 on the real machine 130 at the location of the real machine 130 (e.g. executed on a subsystem within the real machine) to determine a data content type (e.g. a downloadable software program). Local data examination engine 116 may communicate the results of a local data examination to the data content determination engine 104.

FIG. 4 illustrates alternative embodiments of the example operational flow 200 of FIG. 2. FIG. 4 illustrates example embodiments where the operation 230 may include at least one additional operation. Additional operations may include an operation 402, an operation 404, an operation 406, an operation 408, and/or an operation 410.

Operation 402 illustrates determining an acceptability of an effect of the content of the data at least in part via a virtual machine representation of at least a part of a real machine having one or more end-user specified preferences by issuing a request to a remote computer for additional data information. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13. Each of virtual machines 11, 12, and/or 13 may examine (e.g. scan) at least a portion of data (e.g. an imbedded link on a webpage) to determine if the data references additional data (e.g. one or more additional links). Additional data may be a web page comprising text and/or an image, a link to a web page, a video or any combination of text, images, links to web pages, or videos. Virtual machines 11, 12 and/or 13 may traverse additional data to determine an acceptability of an effect of the data content. Effect of content acceptability determination may be communicated to Effect of content acceptability determination engine 106 (FIG. 1A) that may communicate an effect of content acceptability determination to a data provider engine 108 (FIG. 1A).

Further, operation 404 shows determining an acceptability of an effect of the content of the data at least in part via a virtual machine representation of at least a part of a real machine having one or more end-user specified preferences by determining whether data references additional data when loading. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. Any of virtual machines 11, 12 and/or 13 may examine the data in real time as it loads onto the virtual machine 11, 12 and/or 13. For instance, if a link to a webpage immediately (e.g. as soon as the link is activated) references an additional link (e.g. to redirect a user), a virtual machine 11, 12 and/or 13 may determine that such a reference to an additional link has been made. Virtual machines 11, 12 and/or 13 may determine whether data references additional data at any time when the data is loading. Effect of content acceptability determination engine 106 (FIG. 1A) may communicate an effect of content acceptability determination to a data provider engine 108 (FIG. 1A).

Operation 406 depicts determining an acceptability of an effect of the content of the data at least in part via a virtual machine representation of at least a part of a real machine having one or more end-user specified preferences by issuing a request to a remote computer for additional data information. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13. The data of an additional link or links may be examined by at least one of virtual machines 11, 12 and/or 13 issuing a request to receive additional data information from a remote computer (e.g. a computer at a geographically distinct location).

Operation 408, illustrates determining an acceptability of an effect of the content of the data at least in part via a virtual machine representation of at least a part of a real machine having one or more end-user specified preferences by examining a copy of data from a location geographically distinct from a location of the data. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13. The data of an additional link or links may be examined by at least one of virtual machines 11, 12 and/or 13 issuing a request to a remote computer to examine additional data information at the remote computer (e.g. a computer at a geographically distinct location).

Further, operation 410 shows generating a substantial duplicate of at least a part of a real machine at a location geographically distinct from a location of the data. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. For instance, a virtual machine 11, 12 and/or 13 of the real machine may be located at a geographically distinct location such as a remote server, or a remote system configured duplicate data from the real machine 130 and to receive and examine real machine information transferred to the remote server or remote system. System 100 may include any number of communication modules (not shown) configured to communicate over local or remote communication channels.

Figure 5:
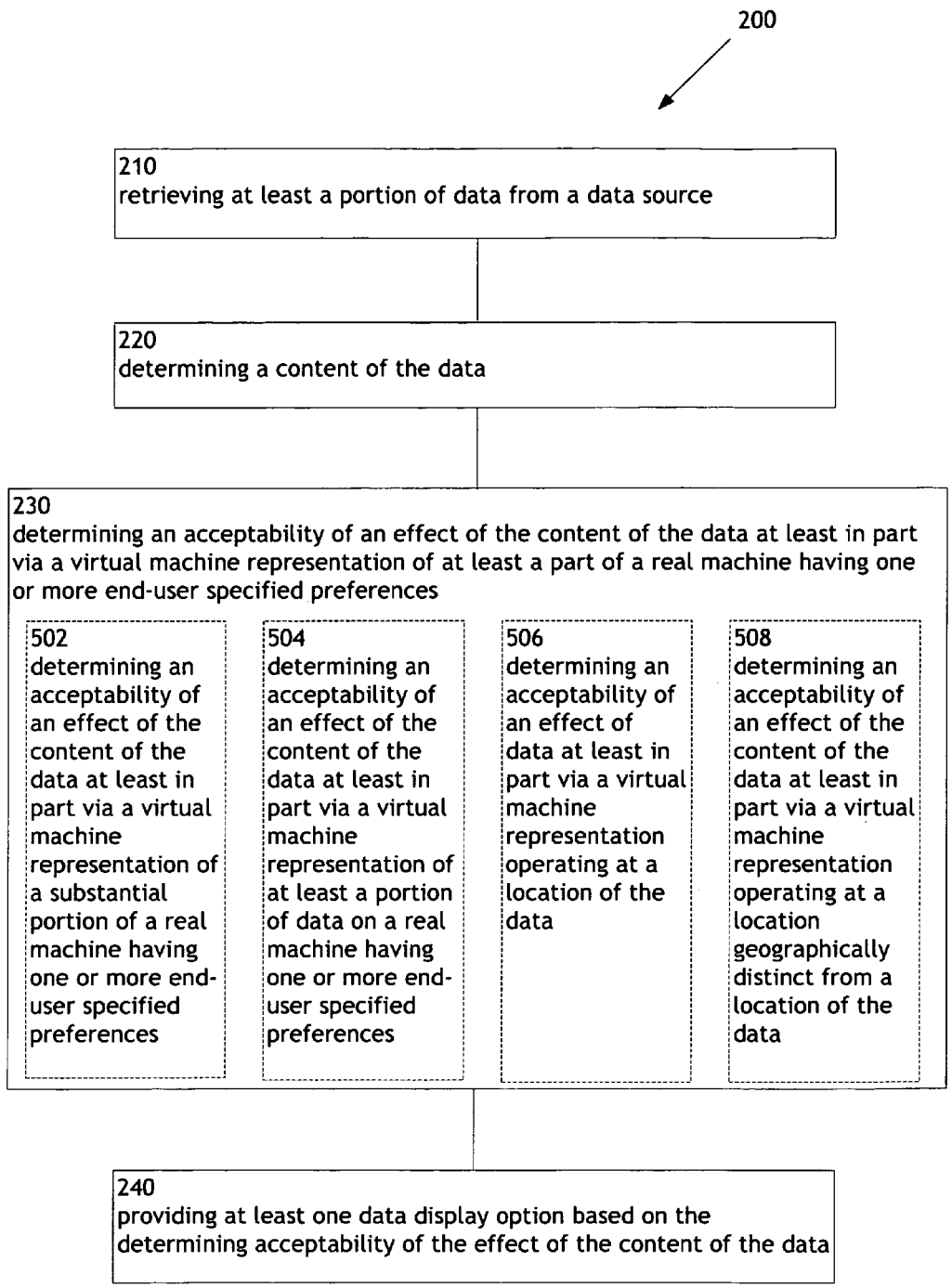
FIG. 5 illustrates an alternative embodiment of the operational flow of FIG. 2.

FIG. 5 illustrates alternative embodiments of the example operational flow 200 of FIG. 2. FIG. 5 illustrates example embodiments where the operation 230 may include at least one additional operation. Additional operations may include an operation 502, an operation 504, an operation 506, and/or an operation 508.

Operation 502, shows determining an acceptability of an effect of the content of the data at least in part via a virtual machine representation of a substantial portion of a real machine having one or more end-user specified preferences. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. For instance, FIG. 1B illustrates virtual machines 11, 12, 14 including a virtual machine representation of content of the real machine 130, software or the real machine 130, hardware of the real machine 130, and an operating system of the real machine 130. Virtual machines 11, 12 and/or 13 may include most or all of at least one of the content of the real machine 130 (e.g. a substantial portion of the text, image, audio, and video files of the real machine), software of the real machine 130 (e.g. a substantial portion of any program or suite of programs installed on the real machine), hardware of the real machine 130 (a substantial portion of the circuitry comprising the real machine), and/or an operating system of the real machine 130 (e.g. a substantial portion of a Windows® operating system installed on the real machine).

Operation 504 depicts for determining an acceptability of an effect of the content of the data at least in part via a virtual machine representation of at least a portion of data on a real machine having one or more end-user specified preferences. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B illustrates virtual machines 11, 12 and/or 13 including a virtual machine representation of content of the real machine 130, a virtual machine representation of software of the real machine 130, a virtual machine representation of hardware of the real machine 130, and/or a virtual machine representation of an operating system of the real machine 130 post activation of link 1, link 2, and link 3 of data 110 (e.g., a Web page) resident on real machine 130. These post activation states are examples of effects of the content of data 110. As additional examples, virtual machines 11, 12 and/or 13 may include at least a portion of at least one of the content of the real machine 130 (e.g. the video files of a real machine), software or the real machine 130 (e.g. iTunes), hardware of the real machine 130 (e.g. a data processor), and/or an operating system of the real machine 130 (e.g. a portion of Netware®).

Operation 506, illustrates determining an acceptability of an effect of data at least in part via a virtual machine representation operating at a location of the data. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIGS. 1B further illustrates virtual machines 11, 12 and/or 13. In one implementation, any of virtual machines 11, 12 and/or 13 may be generated on the real machine 130 (e.g. as a subsystem of real machine 130).

Operation 508, shows determining an acceptability of an effect of the content of the data at least in part via a virtual machine representation operating at a location geographically distinct from a location of the data. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B further illustrates virtual machines 11, 12 and/or 13. In one implementation, any of virtual machines 11, 12 and/or 13 may be generated on a remote server, remote operating system or otherwise geographically distinct location with respect to the real machine 130.

Figure 6:
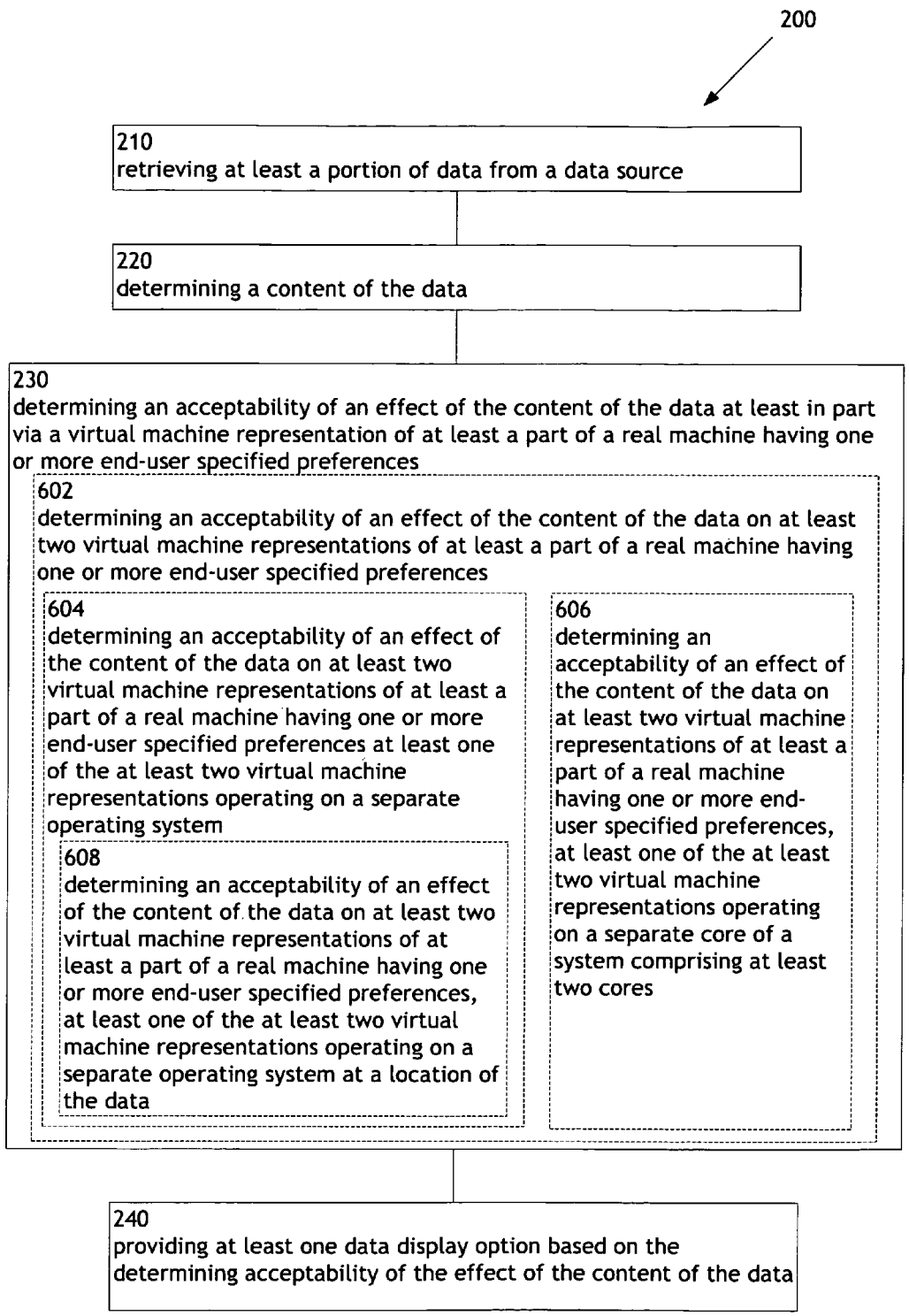
FIG. 6 illustrates an alternative embodiment of the operational flow of FIG. 2.

FIG. 6 illustrates alternative embodiments of the example operational flow 200 of FIG. 2. FIG. 6 illustrates example embodiments where the determining an acceptability of the effect of the data operation 230 may include at least one additional operation. Additional operations may include an operation 602, an operation 604, an operation 606, and/or an operation 608.

Operation 602 depicts determining an acceptability of an effect of the content of the data on at least two virtual machine representations of at least a part of a real machine having one or more end-user specified preferences. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B illustrates virtual machines 11, 12, and 13. At least two of virtual machines 11, 12 and/or 13 may include virtual machine representations of at least a portion of software, hardware and an operating system of the real machine 130.

Further, operation 604, illustrates determining an acceptability of an effect of the content of the data on at least two virtual machine representations of at least a part of a real machine having one or more end-user specified preferences at least one of the at least two virtual machine representations operating on a separate operating system. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. For instance, a virtual machine 11, 12 and/or 13 (FIG. IA) may individually mimic one of Windows XP, Windows 2000 with SQL 2000 and SharePoint Server 2003, Windows 2003 with Exchange 2003, an Apple operating system (e.g., MAC OS 9, OS X Leopard), or Red Hat Linux with Apache. Further, each virtual machine 11, 12 and/or 13 may mimic a different operating system (e.g., virtual machine 11 may mimic Windows XP, virtual machine 12 may mimic Windows 2000 and virtual machine 13 may mimic Red Hat Linux and so on). Operating system may be any software configured to manage the sharing of the resources of a computer, process system data and user inputs, and respond to user inputs by allocating and managing tasks and internal system resources. Operating system may be, for example Microsoft Windows® 2000, XP, or Vista available from Microsoft Corporation of Redmond, Washington, Mac OS X, Linux or any other operating system.

Operation 606, shows determining an acceptability of an effect of the content of the data on at least two virtual machine representations of at least a part of a real machine having one or more end-user specified preferences, at least one of the at least two virtual machine representations operating on a separate core of a system comprising at least two cores. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. As illustrated in FIGS. 1B and 1C, each of virtual machine 11, virtual machine 12, virtual machine 13, virtual machine 21, virtual machine 22, and virtual machine 23 may operate on an individual core 11, 12 and/or 13, 31, 32, 33, respectively, of a multi-core processor, or virtual machine 11 may run on one core and virtual machines 12 and/or 13 may run on the other core of a dual core processor such as an Intel® dual core processor and so on. The multi-core processor may include a plurality of processor cores packaged in one processor package. The term core as used herein may refer, for example, to a single processor of a multiprocessor system, or to a processor core of a multi-core processor. Multi-core processor may be utilized as portable computers such as laptop computers, personal digital assistants, or desktop computers, or servers, or another form of processor based system. Combinations of these types of platforms may be present. The multi-core system may include a multi-core processor, each core comprising a separate address space, and having internal to that address space.

Operation 608, depicts determining an acceptability of an effect of the content of the data on at least two virtual machine representations of at least a part of a real machine having one or more end-user specified preferences, at least one of the at least two virtual machine representations operating on a separate operating system at a location of the data. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. Each of virtual machines 11, 12 and/or 13 may operate on a separate operating system at a location of the data (e.g. executed on a subsystem, such as the virtual machine module 118 (FIG. A) including a plurality of virtual machines 11, 12 and/or 13 (FIG. 1B) within the real machine 130).

Figure 7:
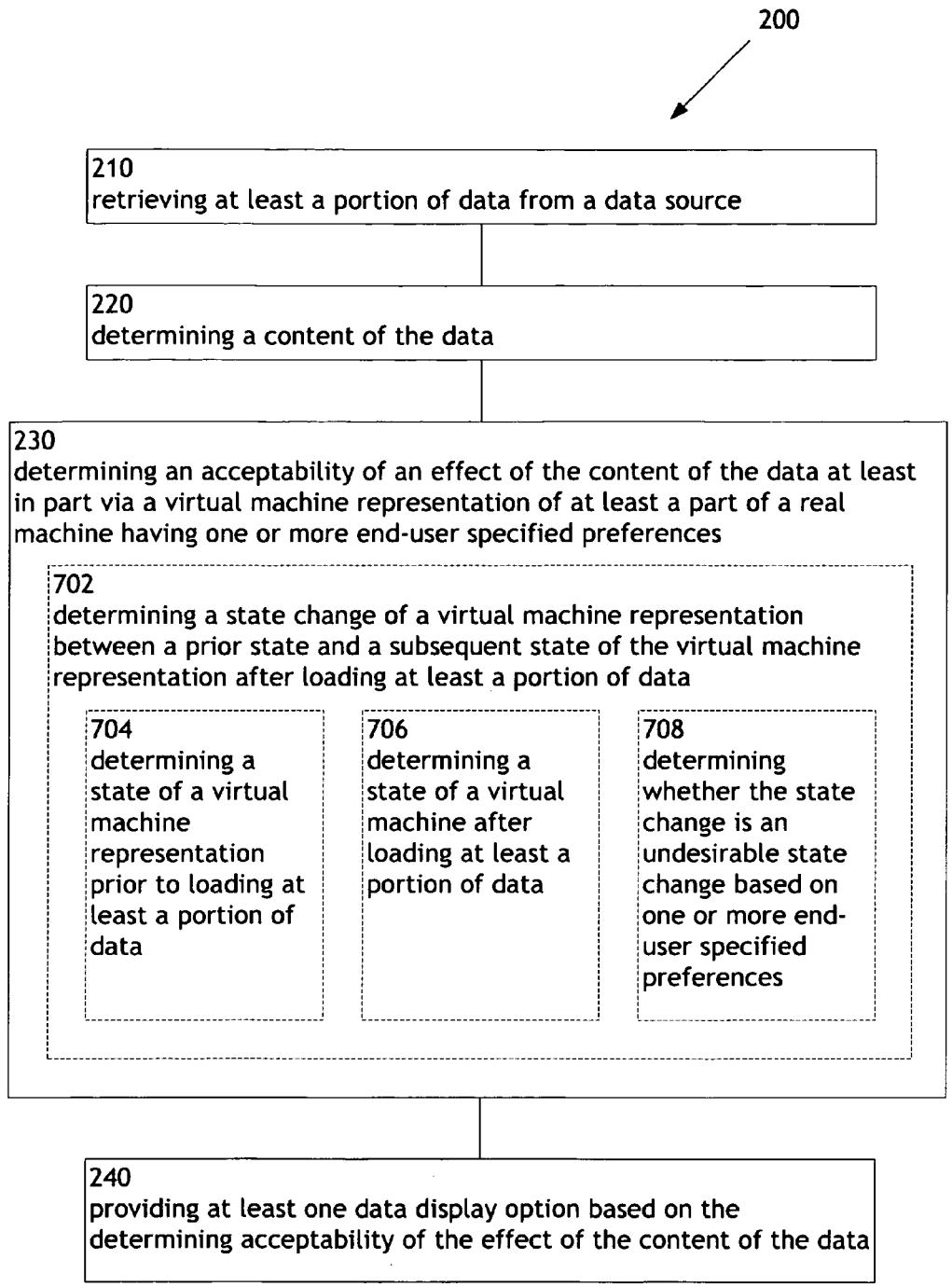
FIG. 7 illustrates an alternative embodiment of the operational flow of FIG. 2.

FIG. 7 illustrates alternative embodiments of the example operational flow 200 of FIG. 2. FIG. 7 illustrates example embodiments where the determining an acceptability of the effect of the data operation 230 may include at least one additional operation. Additional operations may include an operation 702, an operation 704, an operation 706, and/or an operation 708.

Operation 702, illustrates determining a state change of a virtual machine representation between a prior state and a subsequent state of the virtual machine representation after loading at least a portion of data. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer the data and associated data content determination to at least one of virtual machines 11, 12 and/or 13. A state change (e.g. a decrease in memory) of virtual machine 11, 12 and/or 13 (FIG. 1B) may be determined by a component of virtual machine 11, 12 and/or 13 measuring a characteristic of the virtual machine representation of the content, software, hardware or operating system of the real machine 130 before and after the at least a portion of data has loaded. For instance, a state change may be measured after a search result containing a plurality of web links has loaded and at least one web link has been activated.

Operation 704, shows determining a state of a virtual machine representation prior to loading at least a portion of data. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer the data and associated data content determination to at least one of virtual machines 11, 12 and/or 13. Virtual machine 11, 12 and/or 13 may determine a state of at least one component (e.g. the hardware) of the virtual machine prior to activation (e.g. before) of a link. Virtual machine state may be representative of a state for all or at least a portion of the components (e.g. content, software, hardware, operating system) of the real machine 130 represented by the virtual machine 11, 12 and/or 13. For instance, a virtual machine 11, 12 and/or 13 may be determined to be free of viruses, an amount of virtual machine memory may be measured, or a processing speed of the virtual machine 11, 12 and/or 13 may be determined. Virtual machines 11, 12 and/or 13 may contain a diagnostic application configured to analyze virtual machine performance and contents.

Further, operation 706 depicts determining a state of a virtual machine after loading at least a portion of data. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer the data and associated data content determination to at least one of virtual machines 11, 12 and/or 13. Virtual machine 11, 12 and/or 13 may determine a state of at least one component (e.g. the hardware) of the virtual machine subsequent to (e.g. after) activation of a link. For instance a virtual machine state may be representative of a state for all characteristics of the real machine 130 content, software, hardware or operating system represented by the virtual machine 11, 12 and/or 13 after at least a portion of the data has loaded. For instance, a virtual machine 11, 12 and/or 13 may be determined to contain a virus, an amount of virtual machine memory may be measured, or a processing speed of the virtual machine 11, 12 and/or 13 may be determined. Virtual machine 11, 12 and/or 13 may be examined to determine, for example, if a virus or any other undesired software is present on the machine after at least a portion of the data has loaded by examining the virtual machine representation of the operating system of the real machine 130 (FIG. 1B), or if information from the real machine 130 has been transferred to an external location by examining the software of the real machine 130.

Operation 708 depicts determining whether the state change is an undesirable state change based on one or more end-user specified preferences. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer the data and associated data content determination to at least one of virtual machines 11, 12 and/or 13. An undesirable state change may be determined by examining the changes to the virtual machine 11, 12 and/or 13 and comparing the state change of the virtual machine 11, 12 and/or 13 to user preference database information spawned on virtual machines 11, 12 and/or 13 by a transfer of user preference database information from the user preference database 120 (FIG. 1A) to the virtual machine module 118 (FIG. 1A) which spawns a copy of at least a portion of the user preference database 120 (FIG. 1A) onto virtual machines 11, 12 and/or 13. A state change may include any undesirable state changes such as a decrease in memory or processing speed and/or the presence of a virus or other undesirable software after at least a portion of the data has loaded. Undesirable state changes may further include an undesirable transfer of information located on the virtual machine 11, 12 and/or 13 to an external location, an undesirable transfer of data onto the virtual machine 11, 12 and/or 13 from an external location after at least a portion of the data has loaded on the virtual machine 11, 12 and/or 13 that may result in an undesired change in the state of content, software, hardware or an operating system of the real machine 130 and/or an undesirable transfer of data onto the virtual machine 11, 12 and/or 13 where at least a portion of the transferred data may be found objectionable when viewed by a user 10.

Figure 8:
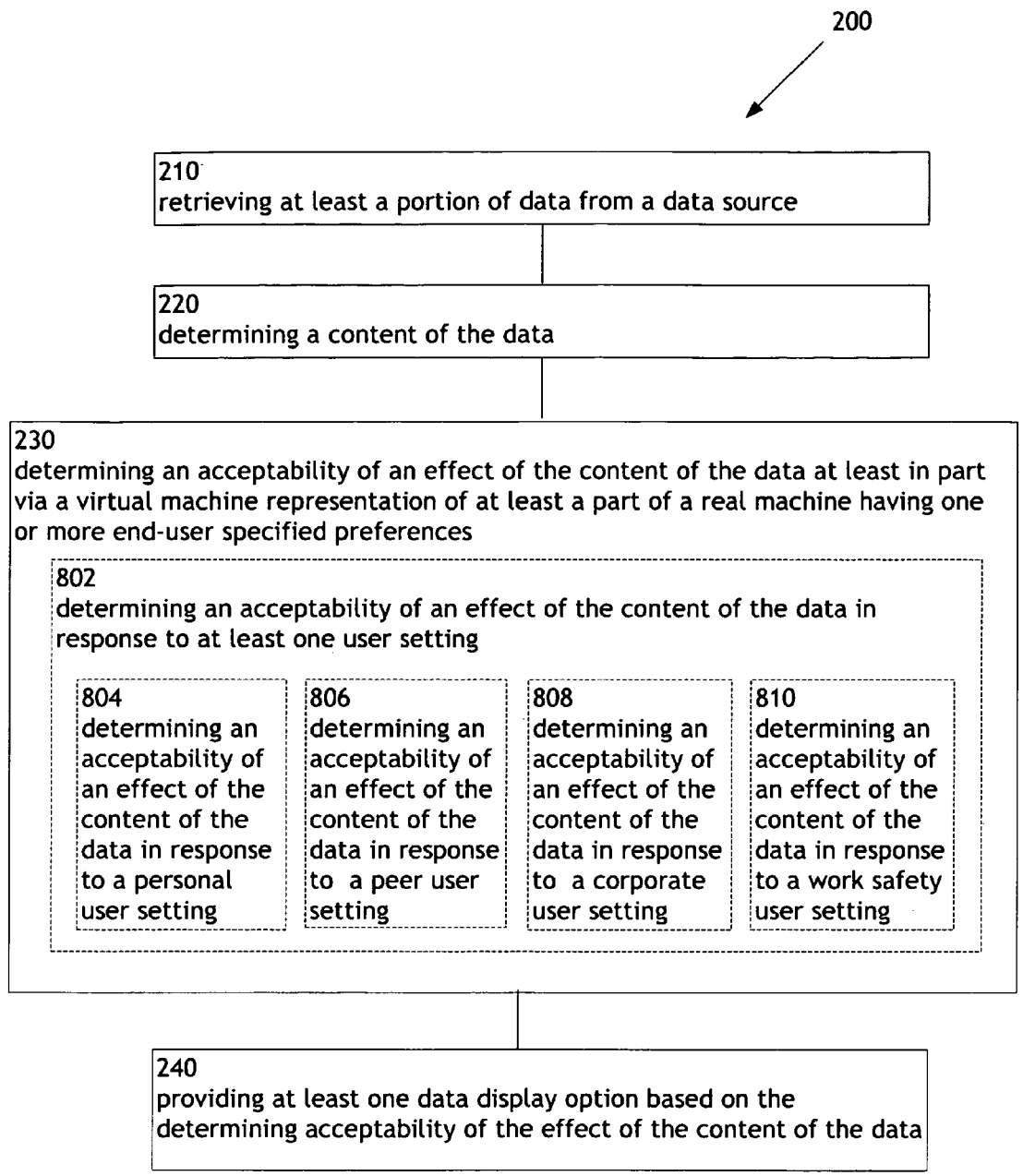
FIG. 8 illustrates an alternative embodiment of the operational flow of FIG. 2.

FIG. 8 illustrates alternative embodiments of the example operational flow 200 of FIG. 2. FIG. 8 illustrates example embodiments where the determining an acceptability of the effect of the data operation 230 may include at least one additional operation. Additional operations may include an operation 802, an operation 804, an operation 806, an operation 808, and/or an operation 810.

Operation 802, illustrates determining an acceptability of an effect of the content of the data in response to at least one user setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. An undesirable state change may be determined by examining the changes to the virtual machine 11, 12 and/or 13 and comparing the state change of the virtual machine 11, 12 and/or 13 to user preference database information spawned on virtual machines 11, 12 and/or 13 by a transfer of user preference database information from the user preference database 120 (FIG. 1A) to the virtual machine module 118 (FIG. 1A) which spawns a copy of at least a portion of the user preference database 120 (FIG. 1A) onto virtual machines 11, 12 and/or 13. User preference database 120 may include at least one end-user specified preference relating to at least one of content, software, hardware and/or an operating system of a real machine 130. At least one of virtual machines 11, 12 and/or 13 may determine an acceptability of an effect of the content of the data based on at least one user setting contained in a user preference database at least a portion of which may be spawned onto virtual machines 11, 12 and/or 13 via virtual machine module 118 (e.g., does a website contain only images, text, audio or visual data suitable for viewing by a user based on a setting established by a user such as a political or cultural preference setting). Further examples of user preferences include specific religion or lifestyle preference, such as "return only links relating to Roman Catholicism" or "return only links relating to a vegan lifestyle" that may be stored in the real machine 130. User-specific preference may also relate to user information safety or computer safety, such as "do not display links requesting information from my computer," or "do not display links that transfer viruses onto my computer."

Operation 804, shows determining an acceptability of an effect of the content of the data in response to a personal user setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module to a personal user setting (e.g. "show only automobile related data") contained in user preference database information spawned on virtual machines 11, 12 and/or 13. User preference database 120 may include at least one personal user setting relating to at least one of content, software, hardware and/or an operating system of a real machine 130. Personal user setting may be a setting input by a user that is personal to the user, such as an information security level, a content filter level, or a personal desirability setting such as "show only non-religious data" or "show only automobile related data."

Further, operation 806 depicts determining an acceptability of an effect of the content of the data in response to a peer user setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module to a peer user setting contained in user preference database information spawned on virtual machines 11, 12 and/or 13. User preference database 120 may include at least one peer user setting relating to at least one of content, software, hardware and/or an operating system of a real machine 130. Peer user setting may be a setting input by a user that is determined by a peer group, such as a peer group determined information security level such as "display only 100 percent secure websites", a peer group determined data filter level such as "filter 100% of obscene data", or a peer group desirability setting such as "show only classical music related data" or "show only knitting related data."

Additionally, operation 808, illustrates determining an acceptability of an effect of the content of the data in response to a corporate user setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer,data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a corporate user setting contained in user preference database information spawned on virtual machines 11, 12 and/or 13. User preference database 120 may include at least one corporate user setting relating to at least one of content, software, hardware and/or an operating system of a real machine 130. Corporate user setting may be a setting inp.ut by a corporation that is determined to the corporation, such as a corporate desirability setting such as "show only real-estate related data" or "show only agricultural related data."

Further, operation 810, shows determining an acceptability of an effect of the content of the data in response to a work safety user setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a work safety user setting contained in user preference database information spawned on virtual machines 11, 12 and/or 13. User preference database 120 may include at least one work safety user setting relating to at least one of content, software, hardware and/or an operating system of a real machine 130. Thus, in one specific example, a webpage or website data may be determined to be determined to be displayable if the data satisfies a work safety user setting such as a corporate information security level, corporate user setting, or a corporate information content filter level corporate user setting.

Figure 9:
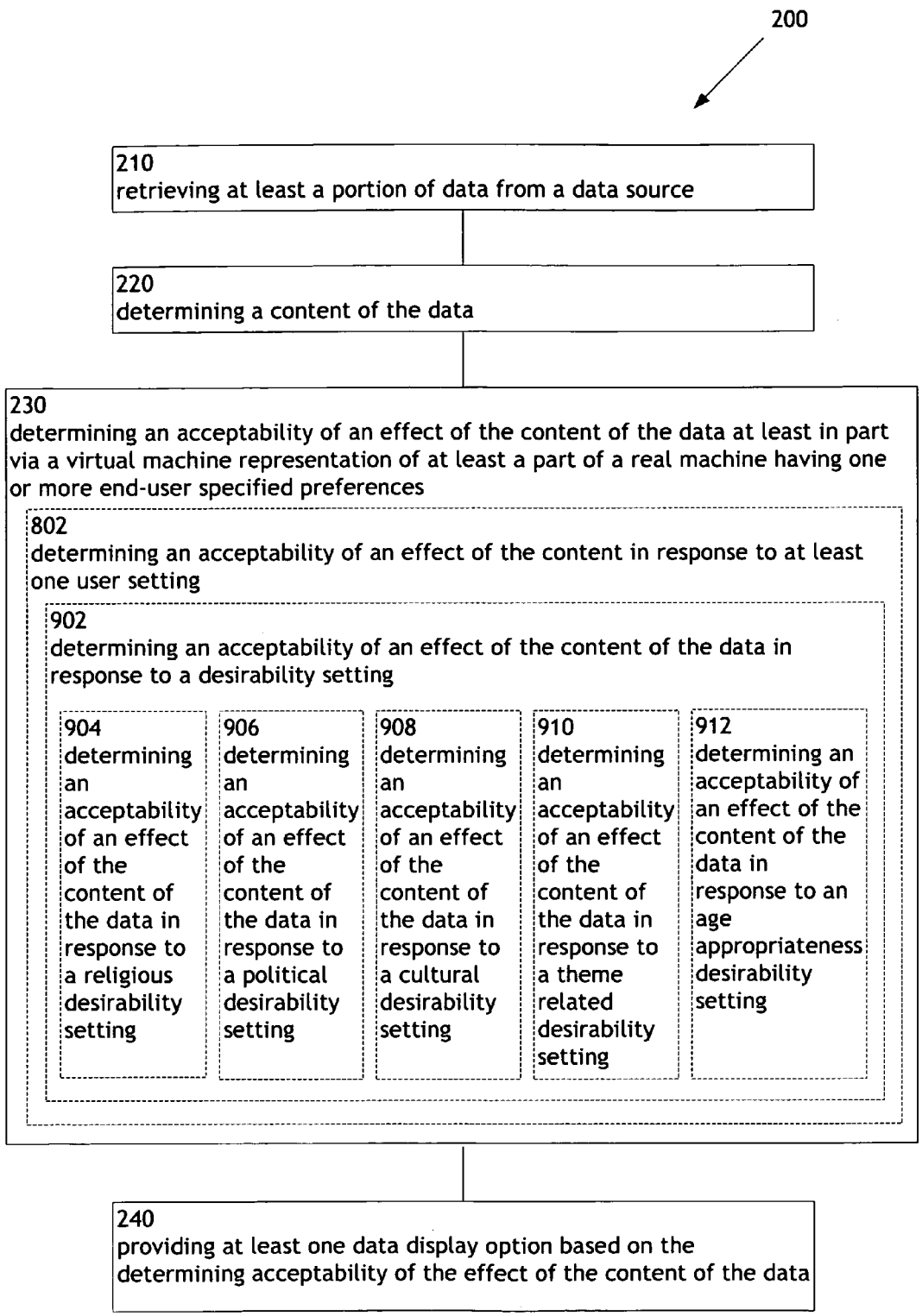
FIG. 9 illustrates an alternative embodiment of the operational flow of FIG. 2.

FIG. 9 illustrates alternative embodiments of the example operational flow 200 of FIG. 2. FIG. 9 illustrates example embodiments where the determining an acceptability of the effect of the data operation 230 may include at least one additional operation. Additional operations may include an operation 902, an operation 904, an operation 906, an operation 908, an operation 910, and/or an operation 912.

Operation 902 depicts determining an acceptability of an effect of the content of the data in response to a desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a desirability setting (e.g., does a website contain only images, text, audio or visual data suitable for viewing by a user based on a desirability setting established by a user such as a desire to view only non-obscene material) contained in user preference database information spawned on virtual machines 11, 12 and/or 13. User preference database 120 may include at least one desirability setting relating to at least one of content, software, hardware and/or an operating system of a real machine 130.

Operation 904, illustrates determining an acceptability of an effect of the content of the data in response to a religious desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a religious desirability setting (e.g., does a website contain only images, text, audio or visual data suitable for viewing by a user based on a religious desirability setting established by a user such as a desire to view only Hindu material) contained in user preference database information spawned on virtual machines 11, 12 and/or 13. A religious desirability setting may be include any setting regarding a major, minor, or other religion such as Christianity, Judaism, Islam, Hinduism, and so on.

Operation 906, shows determining an acceptability of an effect of the content of the data in response to a political desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a political desirability setting (e.g., does a website contain only images, text, audio or visual data suitable for viewing by a user based on a political desirability setting established by a user such as a desire to view only Democratic Party material) contained in user preference database information spawned on virtual machines 11, 12 and/or 13. A political desirability setting may include any setting regarding a political party or affiliation (e.g. Republican, Democratic, Libertarian, Green Party, etc.).

Operation 908 depicts determining an acceptability of an effect of the content of the data in response to a cultural desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a cultural desirability setting (e.g., does a website contain only images, text, audio or visual data suitable for viewing by a user based on a cultural desirability setting established by a user such as a desire to view only materials regarding early Mayan civilization) contained in user preference database information spawned on virtual machines 11, 12 and/or 13. A cultural desirability setting may include any culturally related information such as a religious, ethnic, regional, or heritage based cultural desirability setting or any other cultural desirability setting.

Operation 910, illustrates determining an acceptability of an effect of the content of the data in response to a theme related desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a theme related desirability setting (e.g., does a website contain only images, text, audio or visual data suitable for viewing by a user based on a theme related desirability setting established by a user such as a desire to view only materials regarding collectible stamps) contained in user preference database information spawned on virtual machines 11, 12 and/or 13. A theme related desirability setting may include any theme related information, such as information relating to cars, fashion, electronics, sports, hobbies, collector's items, or any theme or category that may be of interest to a user.

Operation 912, shows determining an acceptability of an effect of the content of the data in response to an age appropriateness desirability setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to an age appropriateness desirability setting (e.g., does a website contain only images, text, audio or visual data suitable for viewing by a user based on an age appropriateness desirability setting established by a user such as a desire to view only materials given a PG or lower rating as determined by the Motion Picture of America Association film rating system) contained in user preference database information spawned on virtual machines 11, 12 and/or 13. An age appropriateness desirability setting may include any age appropriate setting, such as a rating threshold or a profanity threshold.

Figure 10:
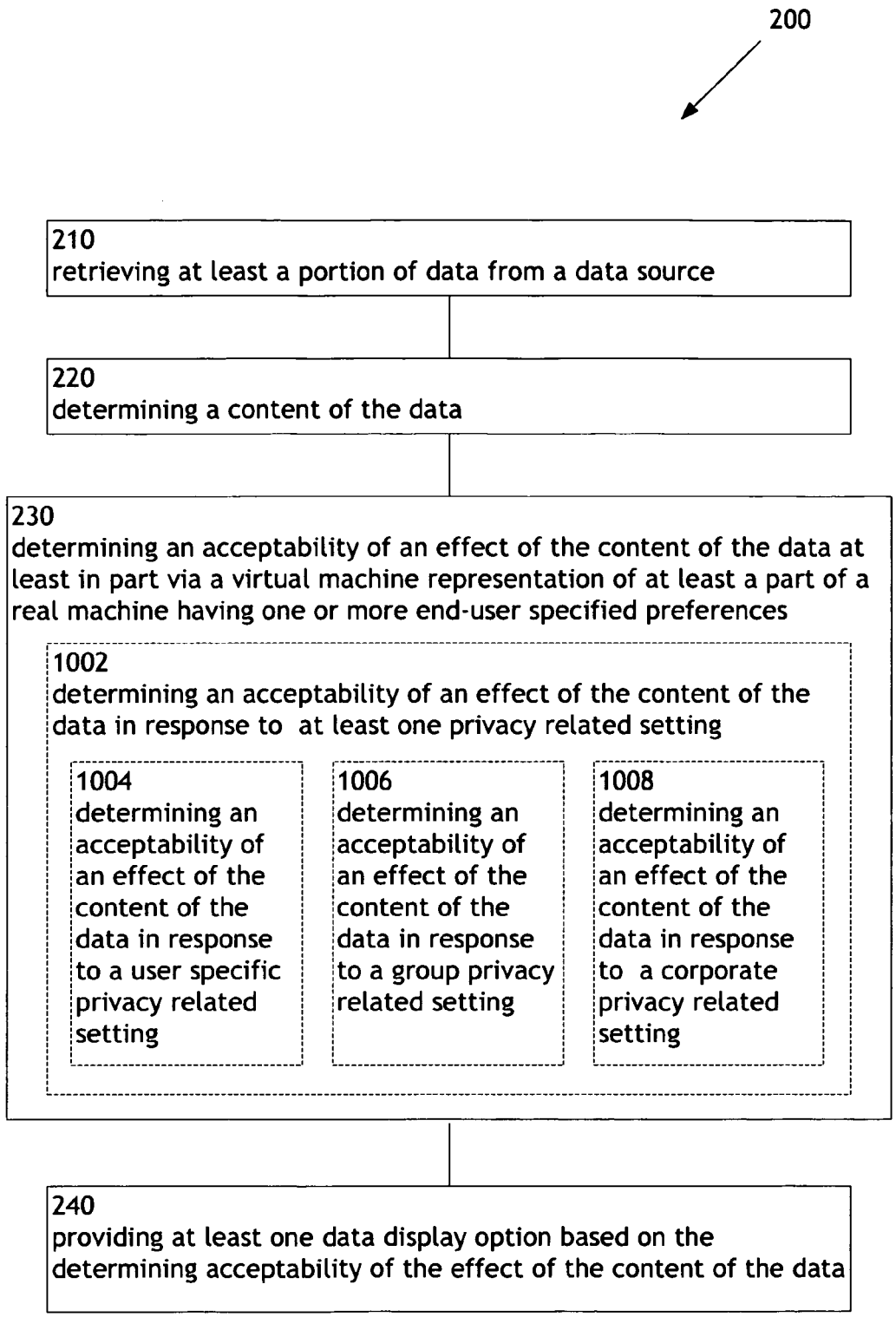
FIG. 10 illustrates an alternative embodiment of the operational flow of FIG. 2.

FIG. 10 illustrates alternative embodiments of the example operational flow 200 of FIG. 2. FIG. 10 illustrates example embodiments where the determining an acceptability of the effect of the data operation 230 may include at least one additional operation. Additional operations may include an operation 1002, an operation 1004, an operation 1006, and/or an operation 1008.

Operation 1002 depicts determining an acceptability of an effect of the content of the data in response to at least one privacy related setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a privacy related setting (e.g., does a website contain only images, text, audio or visual data suitable for viewing by a user based on a privacy related setting established by a user) contained in user preference database information spawned on virtual machines 11, 12 and/or 13. A privacy related setting may include any privacy related settings (e.g., does a website contain only data that will not request information from my computer or allow others to view personal information saved on my computer).

Operation 1004, illustrates determining an acceptability of an effect of the content of the data in response to a user specific privacy related setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a user specific privacy related setting (e.g., will a website request specific information about the user such as name, address, telephone number) contained in user preference database information spawned on virtual machines 11, 12 and/or 13. A user specific privacy related setting may include any user specific privacy related settings (e.g., a setting relating to a user's biographical information or financial information).

Further, operation 1006, shows determining an acceptability of an effect of the content of the data in response to a group privacy related setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a group privacy related setting (e.g., will a website request information about an organization such as name, address, telephone number) contained in user preference database information spawned on virtual machines 11, 12 and/or 13. A group privacy related setting may include any group privacy related settings (e.g., a setting relating to a group's membership). Group privacy related setting may be any setting established by a group such as a work group (e.g. employees of a company), a peer group (e.g., members of a book club), or a family group (e.g. members of family unit) privacy related setting.

Further, operation 1008 depicts determining an acceptability of an effect of the content of the data in response to a corporate privacy related setting. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to a corporate privacy related setting (e.g., will a website request information about a corporation such as data stored on a real machine belonging to the corporation) contained in user preference database information spawned on virtual machines 11, 12 and/or 13. Corporate privacy related setting may be determined by a corporate issued privacy manual, or other such document or mandate set forth by officers of a corporation.

Figure 11:
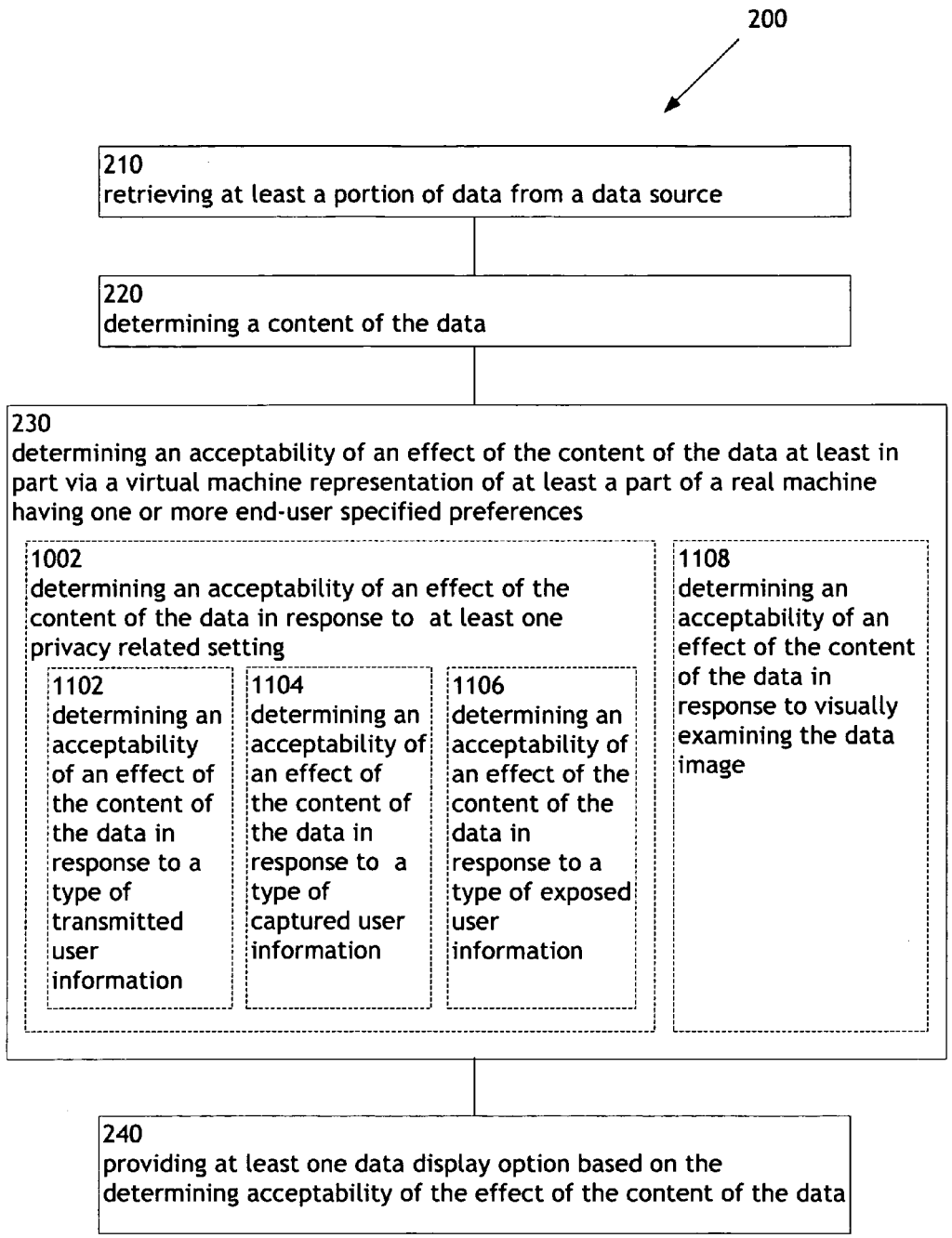
FIG. 11 illustrates an alternative embodiment of the operational flow of FIG. 2.

FIG. 11 illustrates alternative embodiments of the example operational flow 200 of FIG. 2. FIG. 11 illustrates example embodiments where the determining an acceptability of the effect of the data operation 230 may include at least one additional operation. Additional operations may include an operation 1102, an operation 1104, an operation 1106, and/or an operation 1108.

Operation 1102, illustrates determining an acceptability of an effect of the content of the data in response to a type of transmitted user information. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to at least one acceptable type of transmitted user information setting (e.g., do not return links that will transmit my e-mail address, home address or telephone number to an external location) contained in user preference database information spawned on virtual machines 11, 12 and/or 13. Acceptable type of transmitted user information setting may be determined by a user 10 (FIG. 1B). For instance, acceptability of the effect of the data may be determined in response to whether or not private user information, such as credit card numbers, bank accounts, personal identification information or any other personal user information may be transmitted to a location external to the real machine by selecting the link.

Further, operation 1104, shows determining an acceptability of an effect of the content of the data in response to a type of captured user information. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to at least one acceptable type of captured user information setting (e.g., do not return links that will capture my e-mail address, home address or telephone number) contained in user preference database information spawned on virtual machines 11, 12 and/or 13. Acceptable type of captured user information setting may be determined by a user 10 (FIG. 1B). For instance, acceptability of the effect of the data may be determined in response to whether or not private user information, such as credit card numbers, bank accounts, personal identification information or any other personal user information may be captured by a machine located at a location external to the real machine by selecting the link.

Further, operation 1106, illustrates determining an acceptability of an effect of the content of the data in response to a type of exposed user information. Continuing the example above, FIG. 1A shows the Effect of content-acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. Virtual machines 11, 12 and/or 13 may compare the data received from the virtual machine module 118 to at least one acceptable type of exposed user information setting (e.g., do not return links that will expose personal financial information stored on the real machine 130) contained in user preference database information spawned on virtual machines 11, 12 and/or 13. Acceptable type of exposed user information setting may be determined by a user 10 (FIG. 1B). For instance, acceptability of the effect of the data may be determined in response to whether or not private user information, such as credit card numbers, bank accounts, personal identification information or any other personal user information may be exposed to a machine located at a location external to the real machine by selecting the link.

Operation 1108, shows determining an acceptability of an effect of the content of the data in response to visually examining a data image. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. To visually examine a data image, a virtual machine 11, 12 and/or 13 may include an image scanning module. Visually examining the data image may include, for example, color analysis, pattern-matching, pattern-recognition, or any other technique for recognizing a particular image or type of image.

Figure 12:
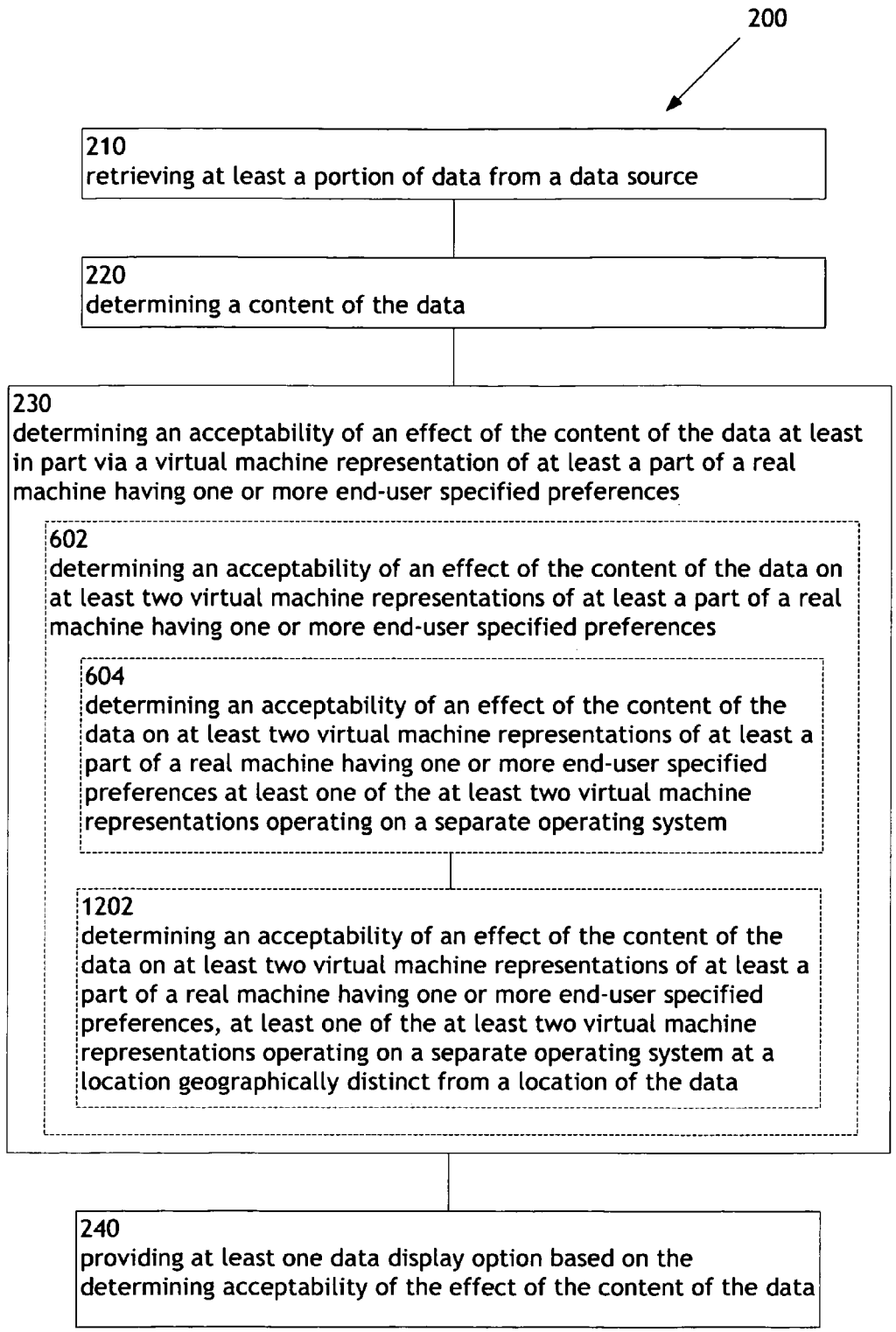
FIG. 12 illustrates an alternative embodiment of the operational flow of FIG. 2.

FIG. 12 illustrates alternative embodiments of the example operational flow 200 of FIG. 2. FIG. 12 illustrates example embodiments where the determining an acceptability of the effect of the data of the data operation 230 may include at least one additional operation. Additional operations may include an operation 1202.

Operation 1202, depicts determining an acceptability of an effect of the content of the data on at least two virtual machine representations of at least a part of a real machine having one or more end-user specified preferences, at least one of the at least two virtual machine representations operating on a separate operating system at a location geographically distinct from a location of the data. Continuing the example above, FIG. 1A shows the Effect of content acceptability determination engine 106 including a virtual machine module 118 further including virtual machines 11, 12 and/or 13. Upon receiving data and a data content determination from data content determination engine 104 post retrieval of data by data retriever engine 102, Effect of content acceptability determination engine 106 may transfer the data and associated data content determination to virtual machine module 118. Virtual machine module 118 may spawn at least one virtual machine 11, 12, and/or 13 and transfer data and associated data content determination to at least one of virtual machines 11, 12 and/or 13. User preference database information stored in the user preference database 120 (FIG. 1A) may be transferred to the virtual machine module 118 (FIG. 1A), which spawns a copy of at least a portion of the user preference database 120 (FIG. 1A) onto virtual machines 11, 12 and/or 13. At least two virtual machines, for example virtual machines 12 and/or 13 may be virtual machines operating at geographically distinct location such as a remote server, or a remote system configured to receive and examine real machine information transferred to the remote system and duplicate data from the real machine 130. In some instances, each virtual machine may be generated on one or more separate cores of a multi-core processor.

Figure 13:
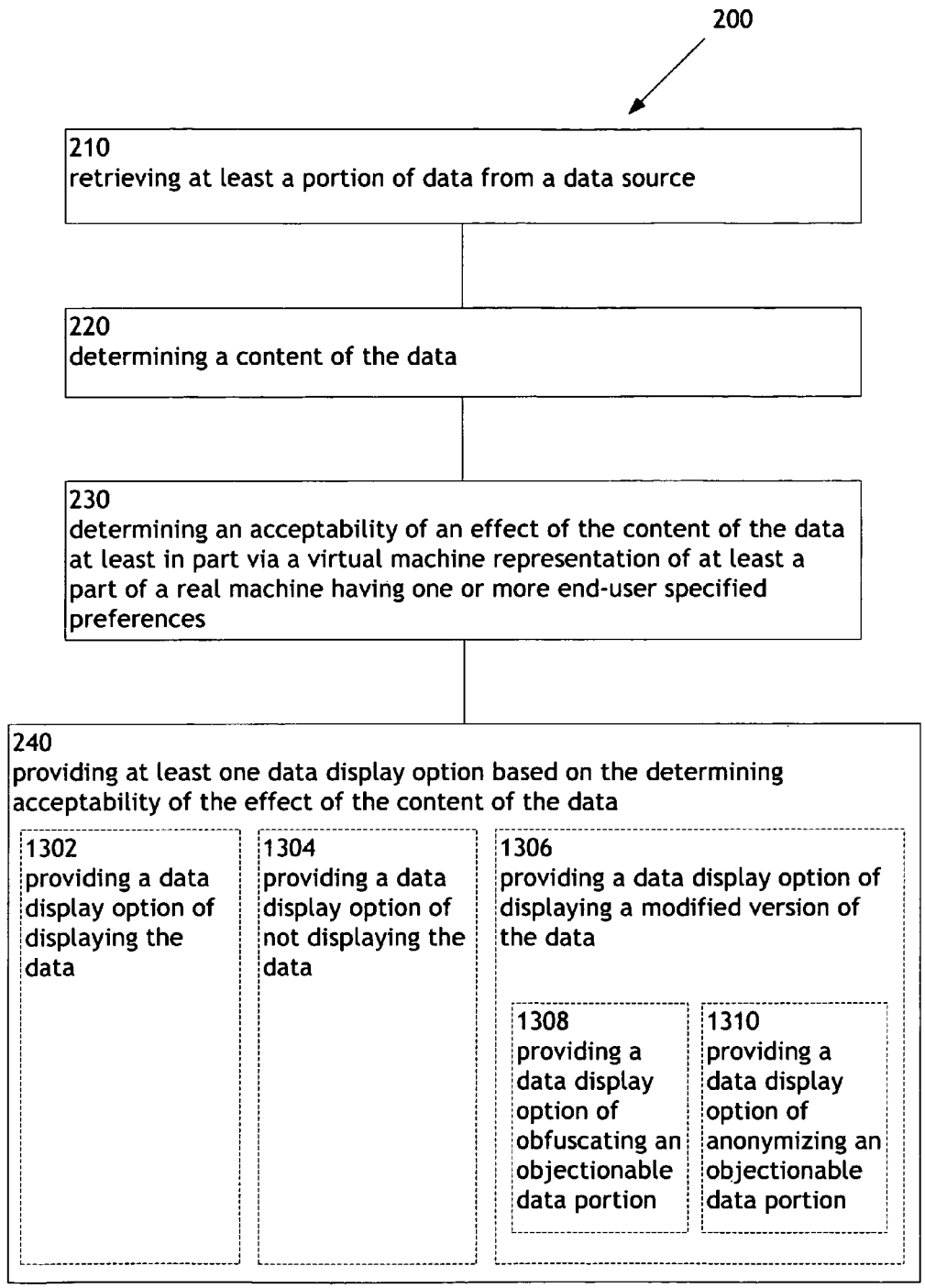
FIG. 13 illustrates an alternative embodiment of the operational flow of FIG. 2.

FIG. 13 illustrates alternative embodiments of the example operational flow 200 of FIG. 2. FIG. 13 illustrates example embodiments where the providing at least one data display option operation 240 may include at least one additional operation. Additional operations may include an operation 1302, an operation 1304, an operation 1306, an operation 1308, and/or an operation 1310.

Operation 1302 illustrates providing a data display option of displaying the data. Continuing the example above, data provider engine 108 (FIG. 1A) may be in communication with Effect of content acceptability determination engine 106 (FIG. IA), which may receive data and an associated data content determination (e.g. data is a video file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying at least a portion of the data. For instance, data content provider engine 108 may receive at least one display instruction (e.g. OK to display the entire text of link 1) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the display instruction to the data content provider engine 108. Data content provider engine 108 may then display the data. Displayed data may be an unmodified web page of text, images and/or video, or a web page including links to additional web pages and may be displayed on a real machine display such as a computer screen.

Operation 1304, shows providing a data display option of not displaying the data. Continuing the example above, data provider engine 108 (FIG. 1A) may be in communication with Effect of content acceptability determination engine 106 (FIG. 1A), which may receive data and an associated data content determination (e.g. data is a video file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of not displaying at least a portion of the data. For instance, data content provider engine 108 may receive at least one do not display instruction (e.g. Do not display the text of link 1) from at least one component of Effect of content acceptability determination engine 106 (FIG. 1A). Each of virtual machines 11, 12 and/or 13 may include one or more instruction generating modules configured to provide a do not display instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the do not display instruction to the data content provider engine 108. The data display option of not displaying the data may include a message indicated why the data is not being displayed, or may be, for example, a blank page displayed on a display of the real machine.

Operation 1306 depicts providing a data display option of displaying a modified version of the data. Continuing the example above, data provider engine 108 (FIG. 1A) may be in communication with Effect of content acceptability determination engine 106 (FIG. 1A), which may receive data and an associated data content determination (e.g. data is a video file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying at least a portion of the data. For instance, data content provider engine 108 may receive at least one modify data instruction (e.g. display only lines 1-10 of the text of link 1) from at least one component of Effect of content acceptability determination engine 106 (FIG. 1A). Each of virtual machines 11, 12 and/or 13 may include one or more instruction generating modules configured to provide a modify data instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the modify data instruction to the data content provider engine 108. The data content provider engine 108 may transmit the modify data instruction to the data modification engine 122 for modification of the data. Data modification engine may transmit the modified data to the data content provider engine 108. Data content provider engine 108 may then display the modified version of the data. Displayed data may be a modified web page of text, a modified image and/or a modified video, or a modified web page including links to additional web pages. For instance, a webpage or website may be displaying, but any obscenities on the web page or website may replaced by non-obscene word alternatives.

Further, operation 1308, illustrates providing a data display option of obfuscating an objectionable data portion. Continuing the example above, data provider engine 108 (FIG. 1A) may be in communication with Effect of content acceptability determination engine 106 (FIG. 1A), which may receive data and an associated data content determination (e.g. data is a video file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of obfuscating (e.g. blurring) a portion of the data (e.g. obscene photos). For instance, data content provider engine 108 may receive at least one obfuscate data instruction (e.g. display only non-obscene portions of the image in link 1) from at least one component of Effect of content acceptability determination engine 106 (FIG. 1A). Each of virtual machines 11, 12 and/or 13 may include one or more instruction generating modules configured to provide an obfuscate data instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the obfuscate data instruction to the data content provider engine 108. The data content provider engine 108 may transmit the obfuscate data instruction to the data modification engine 122 which may transmit the obfuscate data instruction to the data obfuscation engine 124. Data obfuscation engine 124 may transmit the obfuscated data to the data modification engine 122 for transmission to the data content provider engine 108. Data content provider engine 108 may then display the obfuscated version of the data. For example, obfuscating logic may obfuscate restricted data or imagery within a webpage or image. Obfuscation may include blurring or blocking of the objectionable data portion.

Further, operation 1310, shows providing a data display option of anonymizing an objectionable data portion. Continuing the example above, data provider engine 108 (FIG. 1A) may be in communication with Effect of content acceptability determination engine 106 (FIG. 1A), which may receive data and an associated data content determination (e.g. data is a video file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of anonymizing (e.g. obscuring source information) for a portion of the data (e.g. graphic videos). For instance, data content provider engine 108 may receive at least one anonymize data instruction (e.g. obscure source information for portions of the video in link 1) from at least one component of Effect of content acceptability determination engine 106 (FIG. 1A). Each of virtual machines 11, 12 and/or 13 may include one or more instruction generating modules configured to provide an anonymize data instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the anonymize data instruction to the data content provider engine 108. The data content provider engine 108 may transmit the anonymize data instruction to the data modification engine 122 which may transmit the anonymize data instruction to the data anonymization engine 126. Data anonymization engine 126 may transmit the anonymized data to the data modification engine 122 for transmission to the data content provider engine 108. Data content provider engine 108 may then display the anonymized version of the data. Anonymized data may be data in which the original identity information of the data is hidden, obscured, replaced, and/or otherwise modified.

Figure 14:
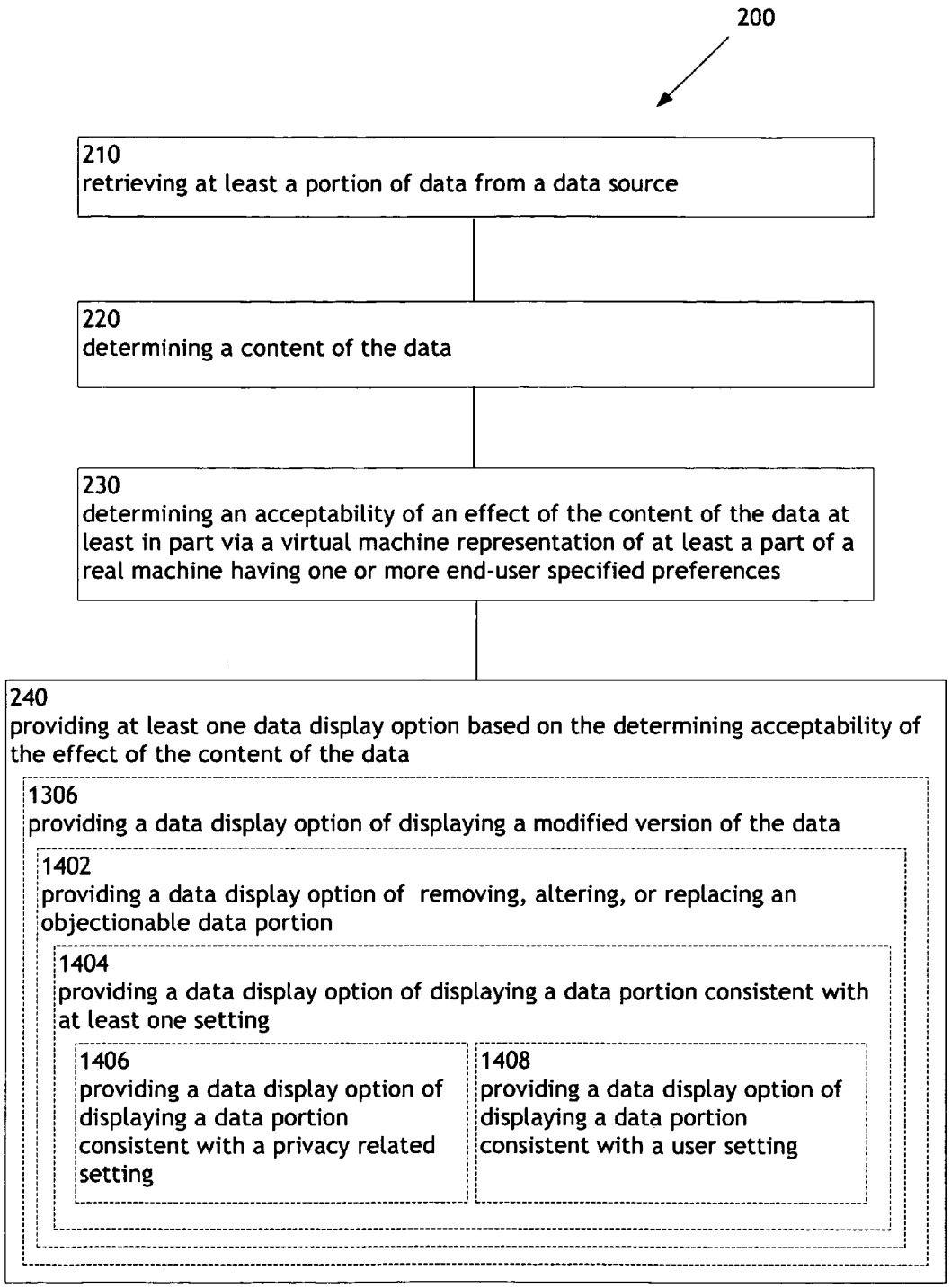
FIG. 14 illustrates an alternative embodiment of the operational flow of FIG. 2.

FIG. 14 illustrates alternative embodiments of the example operational flow 200 of FIG. 2. FIG. 14 illustrates example embodiments where the providing at least one data display option operation 240 may include at least one additional operation. Additional operations may include an operation 1402, an operation 1404, an operation 1406, and/or an operation 1408.

Operation 1402, shows providing a data display option of removing, altering, or replacing an objectionable data portion. Continuing the example above, data provider engine 108 (FIG. 1A) may be in communication with Effect of content acceptability determination engine 106 (FIG. 1A), which may receive data and an associated data content determination (e.g. data is an audio file) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of removing, altering or replacing an objectionable data portion (e.g. replacing profanity with innocuous language) for a portion of the data (e.g. explicit lyrics). For instance, data content provider engine 108 may receive at least one alter, remove or replace instruction (e.g. obscure source information for portions of the video in link 1) from at least one component of Effect of content acceptability determination engine 106 (FIG. 1A). Each of virtual machines 11, 12 and/or 13 may include one or more instruction generating modules configured to provide a remove, alter or replace data instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the remove, alter or replace data instruction to the data content provider engine 108. The data content provider engine 108 may transmit the anonymize data instruction to the data modification engine 122 which may then remove, alter or replace the data. Data modification engine 122 may transmit the data containing removed, altered or replaced portions to the data content provider engine 108. Data content provider engine 108 may then display the data containing removed, altered, or replaced portions. Thus, in one specific example, a portion of a webpage produced by a search including data relating to religions other than Catholicism may be removed from the web page prior to display of the data on a real machine display such as a computer screen.

Operation 1404 depicts providing a data display option of displaying a data portion consistent with at least one setting. Continuing the example above, data provider engine 108 (FIG. 1A) may be in communication with Effect of content acceptability determination engine 106 (FIG. 1A), which may receive data and an associated data content determination (e.g. data is text) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one setting. For instance, data content provider engine 108 may receive at least one display instruction (e.g. OK to display only text consistent with a corporate established setting) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a user setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one setting, the data content provider engine 108 may transmit the modify data instruction to the data modification engine 122 for modification of the data. Data modification engine 122 may transmit the modified data to the data content provider engine 108 (e.g., a setting such as recast all text to large, and reformat a page consistent with the large text, such as might be done for an individual having special vision needs). Data content provider engine 108 may then display the data consistent with the setting.

Further, operation 1406, illustrates providing a data display option of displaying a data portion consistent with a privacy related setting. Continuing the example above, data provider engine 108 (FIG. 1A) may be in communication with Effect of content acceptability determination engine 106 (FIG. 1A), which may receive data and an associated data content determination (e.g. data does not contain spyware) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one privacy related setting. For instance, data content provider engine 108 may receive at least one display instruction (e.g. OK to display webpage) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a privacy related setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one privacy related setting, the data content provider engine 108 may transmit the modify data instruction to the data modification engine 122 for modification of the data. Data modification engine 122 may transmit the modified data to the data content provider engine 108. Data content provider engine 108 may then display the data consistent with the privacy related setting. For instance, a portion of a returned webpage including data requesting private user information such as a user's social security number or e-mail address may be removed from the web page prior to display of the data on a computer screen. Further specific examples include a webpage or website data may be determined to be displayable if the data satisfies a setting such as a privacy related setting such as a setting relating to a user's biographical information or financial information, a webpage or website data may be determined to be displayable if the data satisfies a group privacy related setting such as a work group (e.g. employees of a company), a peer group (e.g., members of a book club), or a family group (e.g. members of family unit) privacy related setting, or a webpage or website data may be determined to be displayable if the data satisfies a privacy setting determined by a corporation or other organization to maintain corporate or organization privacy.

Further, operation 1408, shows providing a data display option of displaying a data portion consistent with a user setting. Continuing the example above, data provider engine 108 (FIG. 1A) may be in communication with Effect of content acceptability determination engine 106 (FIG. 1A), which may receive data and an associated data content determination (e.g. data does not contain malware) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one user setting. For instance, data content provider engine 108 may receive at least one display instruction (e.g. OK to display webpage) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a user setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one user setting, the data content provider engine 108 may transmit the modify data instruction to the data modification engine 122 for modification of the data. Data modification engine 122 may transmit the modified data to the data content provider engine 108. Data content provider engine 108 may then display the data consistent with the user setting. Thus, a webpage or website data may be determined to be displayable if the data satisfies a user setting when the virtual machine 11, 12 and/or 13 compares the data to the user setting. For instance, a portion of a webpage produced by a search including non-English text may be removed from the web page prior to display of the data on a computer screen. Further, in one specific example, a webpage or website data may be determined to be displayable if the data satisfies a peer user setting, or a webpage or website data may be determined to be displayable if the data satisfies, for instance, a corporate user setting.

Figure 15:
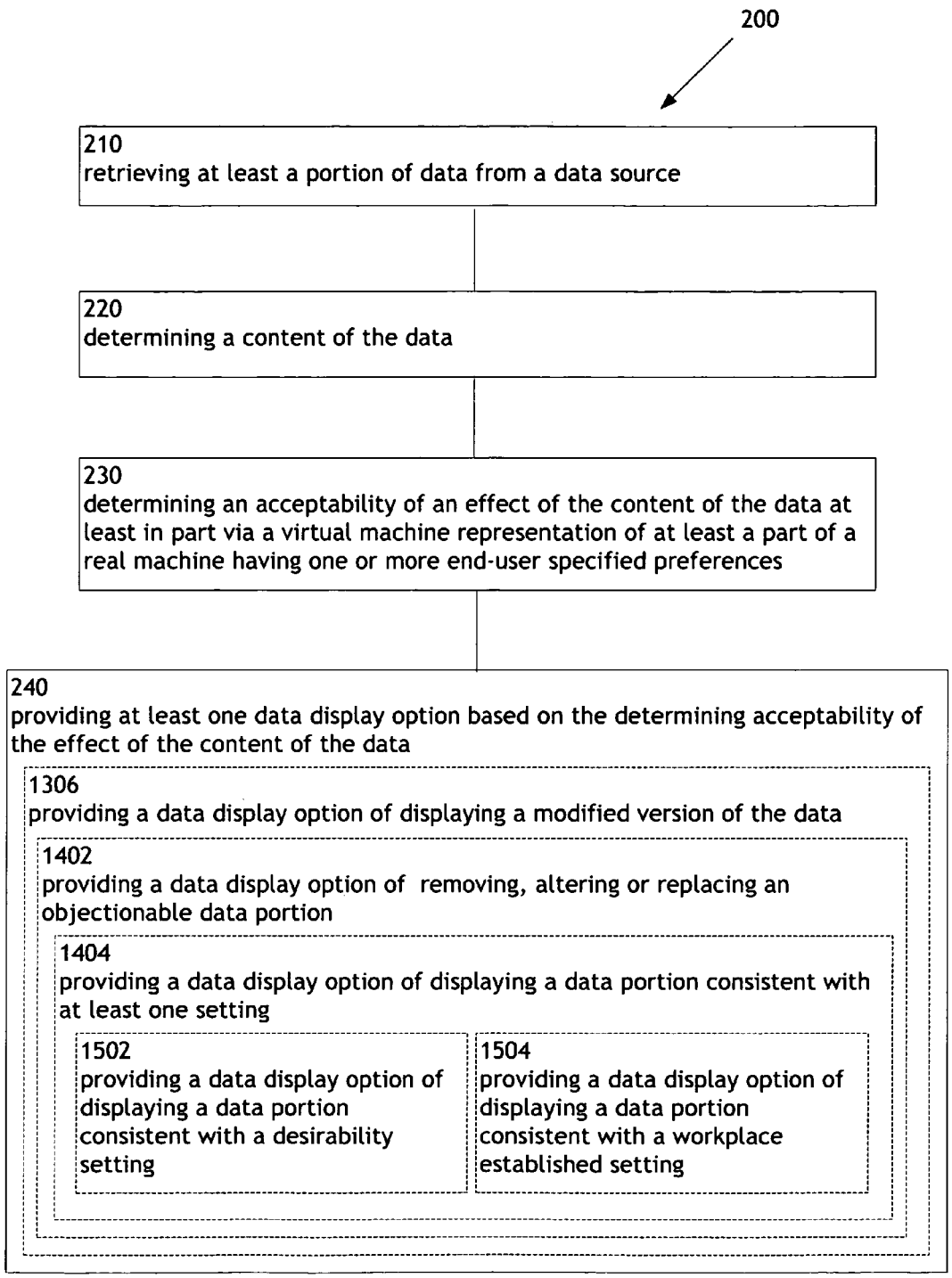
FIG. 15 illustrates an alternative embodiment of the operational flow of FIG. 2.

FIG. 15 illustrates alternative embodiments of the example operational flow 200 of FIG. 2. FIG. 15 illustrates example embodiments where the providing at least one data display option operation 240 may include at least one additional operation. Additional operations may include an operation 1502, and/or an operation 1504.

Operation 1502 depicts providing a data display option of displaying a data portion consistent with a desirability setting. Continuing the example above, data provider engine 108 (FIG. 1A) may be in communication with Effect of content acceptability determination engine 106 (FIG. 1A), which may receive data and an associated data content determination (e.g. data is an image) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one desirability setting. For instance, data content provider engine 108 may receive at least one display instruction (e.g. OK to display image) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a desirability setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one desirability setting, the data content provider engine 108 may transmit the modify data instruction to the data modification engine 122 for modification of the data. Data modification engine 122 may transmit the modified data to the data content provider engine 108. Data content provider engine 108 may then display the data portion consistent with the desirability setting. For instance, the data display option may be displaying on a display of a real machine only a data portion consistent with a Christian desirability setting such as "display only Christianity related data." In other examples, a webpage or website data may be determined to be displayable if the data satisfies a desirability setting, a webpage or website data may be determined to be displayable if the data satisfies a religious desirability setting such as a Christian, Jewish, and/or Muslim, based religious desirability setting, or may be based on any other major, minor or alternative religious desirability setting, a webpage or website data may be determined to be displayable if the data satisfies a political desirability setting such as a Republican, Democratic, Libertarian or Green Party political desirability setting, a webpage or website data may be determined to be displayable if the data satisfies a cultural desirability setting such as a religious, ethnic, regional, or heritage based cultural desirability setting or any other cultural desirability setting, a webpage or website data may be determined to be displayable if the data satisfies a theme related desirability setting such as boating or card games, or a webpage or website data may be determined to be displayable if the data satisfies an age appropriateness desirability setting such as a setting based on the Motion Picture of America Association film rating system.

Further, operation 1504, illustrates providing a data display option of displaying a data portion consistent with a workplace established setting. Continuing the example above, data provider engine 108 (FIG. 1A) may be in communication with Effect of content acceptability determination engine 106 (FIG. 1A), which may receive data and an associated data content determination (e.g. data is a social networking site) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one workplace established setting. For instance, data content provider engine 108 may receive at least one display instruction (e.g. do not display data) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a workplace established setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one workplace established setting, the data content provider engine 108 may transmit the modify data instruction to the data modification engine 122 for modification of the data. Data modification engine 122 may transmit the modified data to the data content provider engine 108. Data content provider engine 108 may then display the data portion consistent with the workplace established setting. For instance, the data display option may be displaying on a display of a real machine only a data portion consistent with a workplace appropriateness desirability setting such as "display only non-obscene data."

Figure 16:
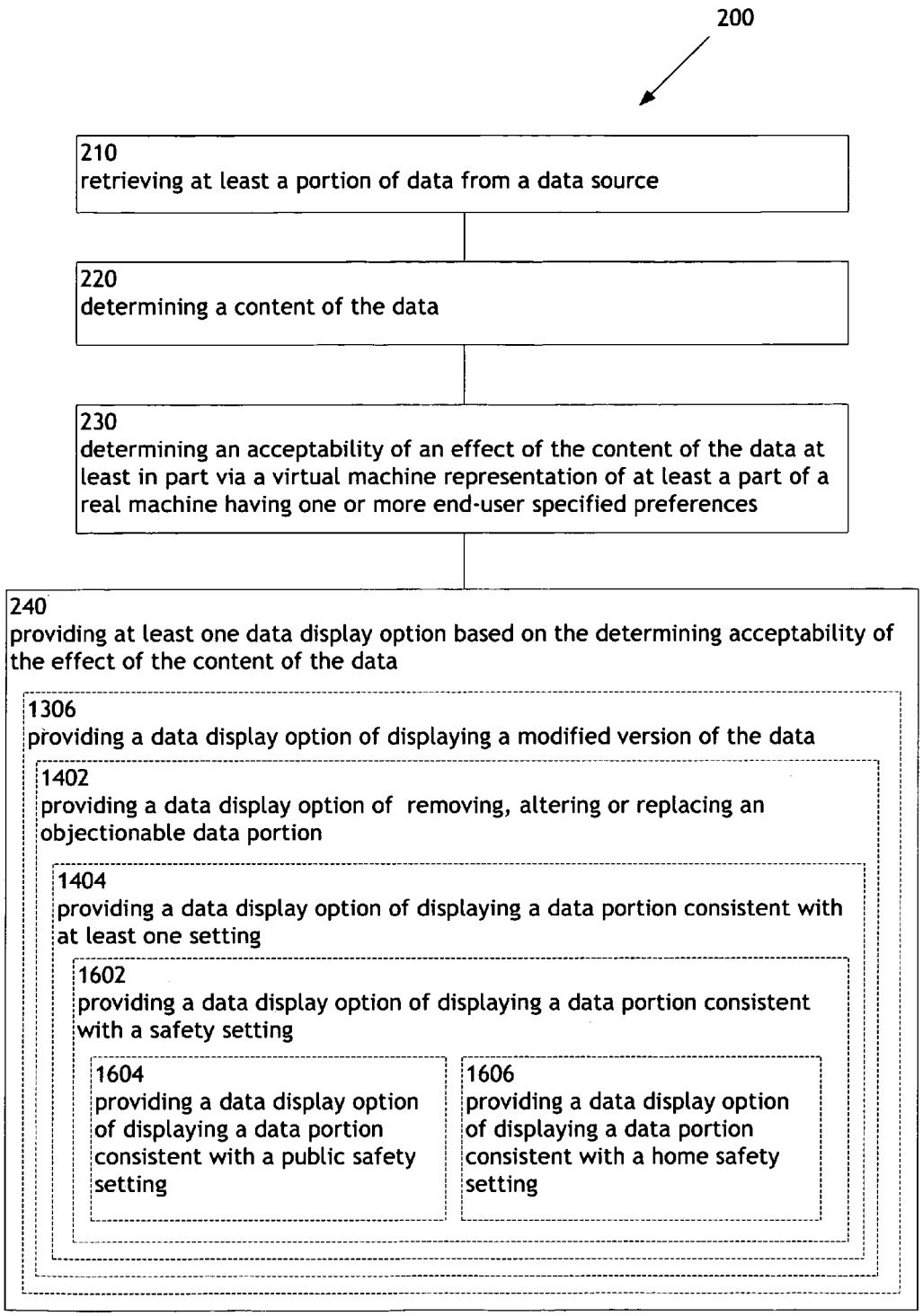
FIG. 16 illustrates an alternative embodiment of the operational flow of FIG. 2.

FIG. 16 illustrates alternative embodiments of the example operational flow 200 of FIG. 2. FIG. 16 illustrates example embodiments where the providing at least one data display option operation 240 may include at least one additional operation. Additional operations may include an operation 1602, an operation 1604, and/or an operation 1606.

Operation 1602, shows providing a data display option of displaying a data portion consistent with a safety setting. Continuing the example above, data provider engine 108 (FIG. 1A) may be in communication with Effect of content acceptability determination engine 106 (FIG. 1A), which may receive data and an associated data content determination (e.g. data is an image) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one safety setting. For instance, data content provider engine 108 may receive at least one display instruction (e.g. OK to display image) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a safety setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one safety setting, the data content provider engine 108 may transmit the modify data instruction to the data modification engine 122 for modification of the data. Data modification engine 122 may transmit the modified data to the data content provider engine 108. Data content provider engine 108 may then display the data portion consistent with the safety setting. For instance, the data display option may be displaying on a display of a real machine only a data portion consistent with child safety setting such as "display only non-violent data," or "display only ethnic and gender neutral data."

Further, operation 1604 depicts providing a data display option of displaying a data portion consistent with a public safety setting. Continuing the example above, data provider engine 108 (FIG. 1A) may be in communication with Effect of content acceptability determination engine 106 (FIG. 1A), which may receive data and an associated data content determination (e.g. data is an image) from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one desirability setting. For instance, data content provider engine 108 may receive at least one display instruction (e.g. OK to display image) from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a desirability setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one public safety setting, the data content provider engine 108 may transmit the modify data instruction to the data modification engine 122 for modification of the data. Data content provider engine 108 may then display the data portion consistent with the public safety setting. For instance, the data display option may be displaying on a display of a real machine only a data portion consistent with public safety setting such as "display only non-confidential data."

Further, operation 1606, illustrates providing a data display option of displaying a data portion consistent with a home safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one home safety setting. For instance, data content provider engine 108 may receive at least one display instruction from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a home safety setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one home safety setting, the data content provider engine 108 may transmit the modify data instruction to the data modification engine 122 for modification of the data. Data content provider engine 108 may then display the data portion consistent with the home safety setting. For instance, the data display option may be displaying on a display of a real machine only a data portion consistent with home safety setting such as "okay to display private or confidential data."

Figure 17:
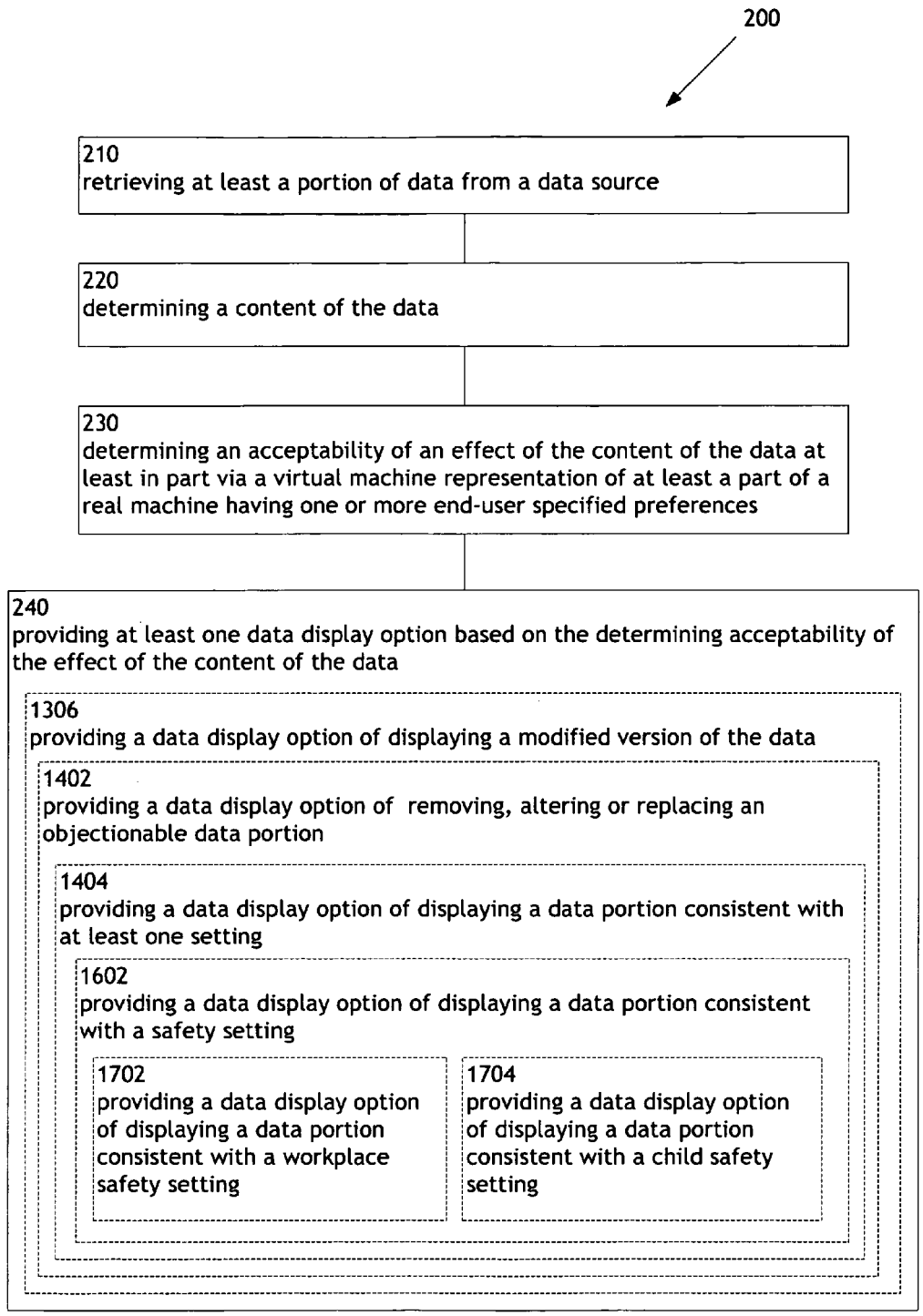
FIG. 17 illustrates an alternative embodiment of the operational flow of FIG. 2.

FIG. 17 illustrates alternative embodiments of the example operational flow 200 of FIG. 2. FIG. 17 illustrates example embodiments where the providing at least one data display option operation 240 may include at least one additional operation. Additional operations may include an operation 1702, and/or an operation 1704.

Operation 1702 shows providing a data display option of displaying a data portion consistent with a workplace safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one workplace safety setting. For instance, data content provider engine 108 may receive at least one display instruction from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a workplace safety setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one workplace safety setting, the data content provider engine 108 may transmit the modify data instruction to the data modification engine 122 for modification of the data. Data content provider engine 108 may then display the data portion consistent with the workplace safety setting. For instance, the data display option may be displaying on a display of a real machine only a data portion consistent with a workplace safety setting such as "display only non-personal data."

Further, operation 1704 shows providing a data display option of displaying a data portion consistent with a child safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of displaying data consistent with at least one child safety setting. For instance, data content provider engine 108 may receive at least one display instruction from at least one component of Effect of content acceptability determination engine 106 (FIG. 1A). Each of virtual machines 11, 12 and/or 13 may include one or more instruction generating modules configured to provide an instruction to the Effect of content acceptability determination engine 106 after a comparison of an activation of a link to a child safety setting stored in a copy of the user preference database 120 (FIG. 1A) spawned on the virtual machine 11, 12 and/or 13. Effect of content acceptability determination engine 106 may communicate the display instruction to the data content provider engine 108. If data needs to be modified to be consistent with at least one child safety setting, the data content provider engine 108 may transmit the modify data instruction to the data modification engine 122 for modification of the data. Data content provider engine 108 may then display the data portion consistent with the child safety setting. For instance, the data display option may be displaying on a display of a real machine only a data portion consistent with a child safety setting such as "display only non-violent data."

Figure 18:
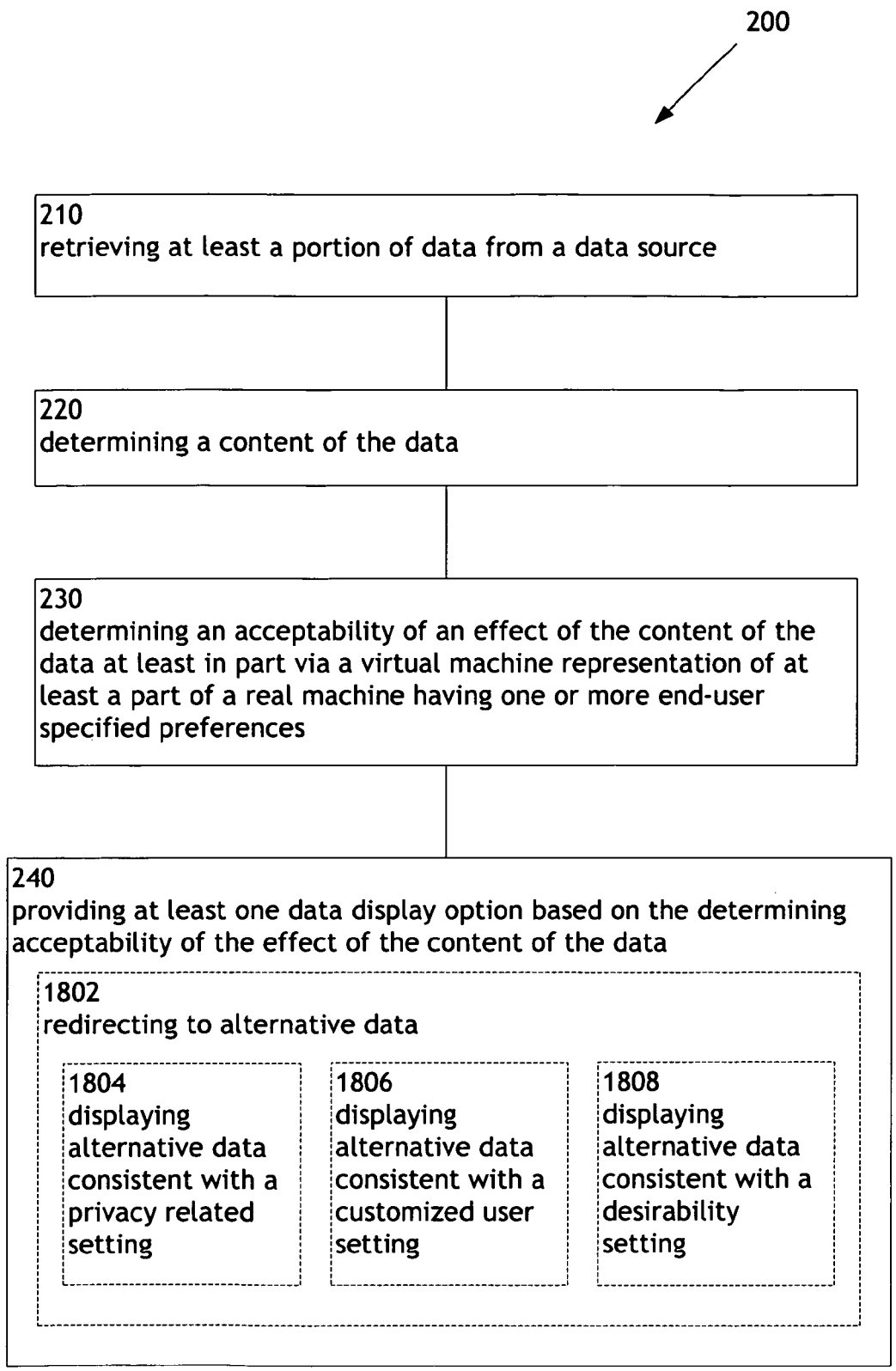
FIG. 18 illustrates an alternative embodiment of the operational flow of FIG. 2.

FIG. 18 illustrates alternative embodiments of the example operational flow 200 of FIG. 2. FIG. 18 illustrates example embodiments where the providing at least one data display option operation 240 may include at least one additional operation. Additional operations may include an operation 1802, an operation 1804, an operation 1806, and/or an operation 1808.

Operation 1802 shows redirecting to alternative data a user may be redirected to alternative data. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the redirect instruction to the data content provider engine 108. The data content provider engine 108 may transmit the redirect data instruction to the data redirection engine 128 for redirection to alternative data. The data redirection engine 128 may transmit the redirection to the data content provider engine 108. Data content provider engine 108 may then display the alternative data.

Operation 1804 shows displaying alternative data consistent with a privacy related setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a privacy related setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a privacy related setting stored in a copy of the user preference database 120 (FIG. 1A) spawned on the virtual machine 11, 12 and/or 13. Effect of content acceptability determination engine 106 may communicate the redirect to alternative data consistent with a privacy related setting instruction to the data content provider engine 108. The data content provider engine 108 may transmit the redirect data instruction to the data redirection engine 128 for redirection to alternative data consistent with a privacy related setting. The data redirection engine 128 may transmit the redirection to the data content provider engine 108. Data content provider engine 108 may then display the alternative data. Displaying alternative data consistent with a privacy related setting may include displaying a different webpage including only information consistent with a privacy related setting such as "display only links that do not request e-mail addresses." Privacy related setting may be any privacy related setting described above and may include any additional privacy related settings.

Further, operation 1806 shows displaying alternative data consistent with a customized user setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a customized user setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a customized user setting stored in a copy of the user preference database 120 (FIG. 1A) spawned on the virtual machine 11, 12 and/or 13. Effect of content acceptability determination engine 106 may communicate the redirect to alternative data consistent with a customized user setting instruction to the data content provider engine 108. The data content provider engine 108 may transmit the redirect data instruction to the data redirection engine 128 for redirection to alternative data consistent with a customized user setting. The data redirection engine 128 may transmit the redirection to the data content provider engine 108. Data content provider engine 108 may then display the alternative data. Displaying alternative data consistent with a customized user setting may include displaying a different webpage including only information consistent with a customized user setting such as "display only links containing French text." Thus, in one specific example, a webpage or website data may be determined to be displayable if the data satisfies a customized user setting when the virtual machine 11, 12 and/or 13 compares the data to the customized user setting.

Further, operation 1808 shows displaying alternative data consistent with a desirability setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a desirability setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a desirability setting stored in a copy of the user preference database 120 (FIG. 1A) spawned on the virtual machine 11, 12 and/or 13. Effect of content acceptability determination engine 106 may communicate the redirect to alternative data consistent with a desirability setting instruction to the data content provider engine 108. The data content provider engine 108 may transmit the redirect data instruction to the data redirection engine 128 for redirection to alternative data consistent with a desirability setting. The data redirection engine 128 may transmit the redirection to the data content provider engine 108. Data content provider engine 108 may then display the alternative data. Displaying alternative data consistent with a desirability setting may include displaying a different webpage including only information consistent with a desirability setting such as "display only links containing information relating to art." Desirability setting may be any desirability setting described above and may include any additional desirability settings.

Figure 19:
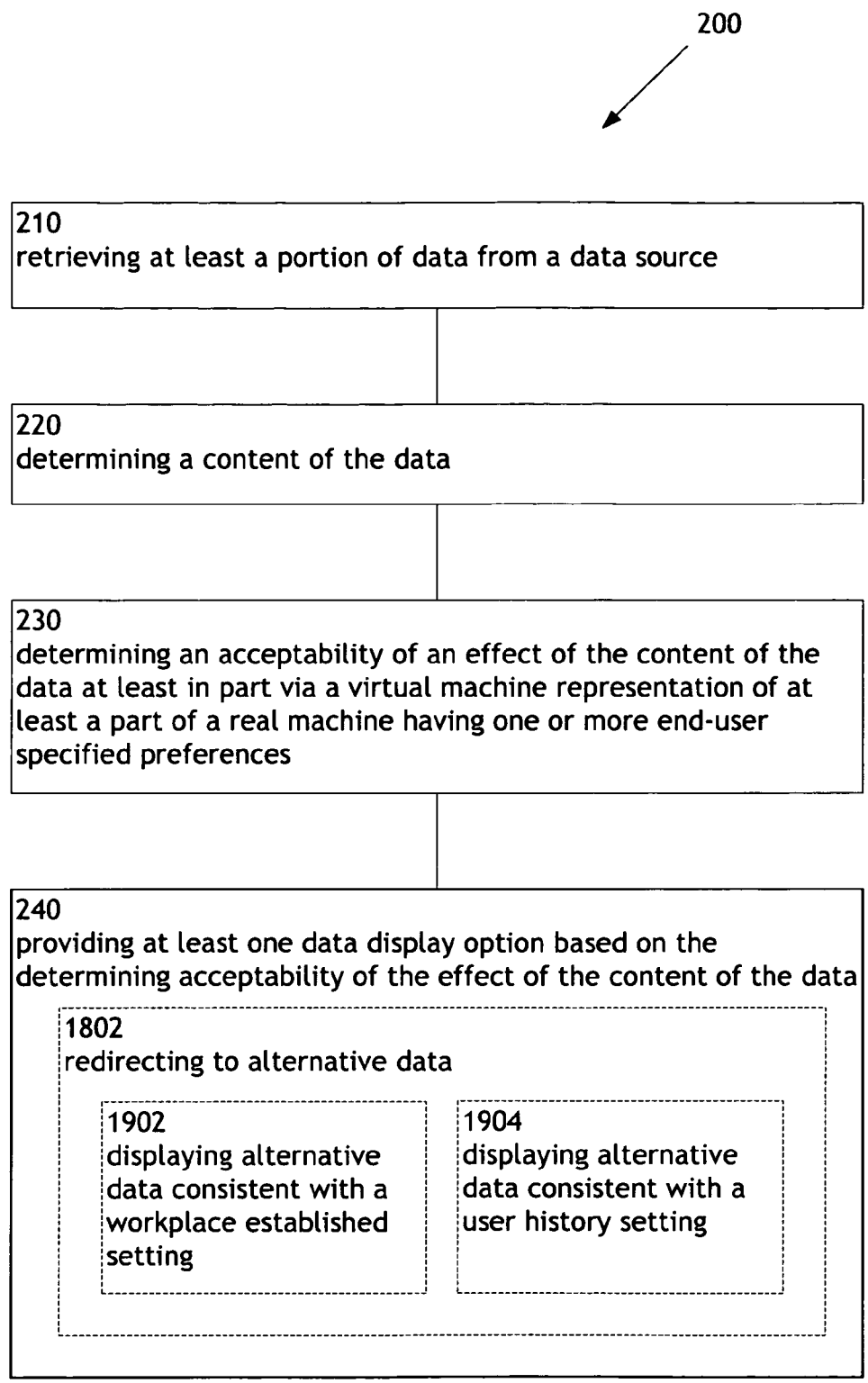
FIG. 19 illustrates an alternative embodiment of the operational flow of FIG. 2.

FIG. 19 illustrates alternative embodiments of the example operational flow 200 of FIG. 2. FIG. 19 illustrates example embodiments where the providing at least one data display option operation 240 may include at least one additional operation. Additional operations may include an operation 1902, and/or an operation 1904.

Operation 1902 shows displaying alternative data consistent with a workplace established setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a workplace established setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a workplace established setting stored in a copy of the user preference database 120 (FIG. 1A) spawned on the virtual machine 11, 12 and/or 13. Effect of content acceptability determination engine 106 may communicate the redirect to alternative data consistent with a workplace established setting instruction to the data content provider engine 108. The data content provider engine 108 may transmit the redirect data instruction to the data redirection engine 128 for redirection to alternative data consistent with a workplace established setting. The data redirection engine 128 may transmit the redirection to the data content provider engine 108. Data content provider engine 108 may then display the alternative data. Displaying alternative data consistent with a workplace established setting may include displaying a different webpage including only information consistent with a workplace established setting such as "do not display links to social networking websites."

Operation 1904 shows displaying alternative data consistent with a user history setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a user history setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a user history setting stored in a copy of the user preference database 120 (FIG. 1A) spawned on the virtual machine 11, 12 and/or 13. Effect of content acceptability determination engine 106 may communicate the redirect to alternative data consistent with a user history setting instruction to the data content provider engine 108. The data content provider engine 108 may transmit the redirect data instruction to the data redirection engine 128 for redirection to alternative data consistent with a user history setting. The data redirection engine 128 may transmit the redirection to the data content provider engine 108. Data content provider engine 108 may then display the alternative data. For instance, displayed alternative data may be consistent with a user history such as having viewed only music related data and pages.

Figure 20:
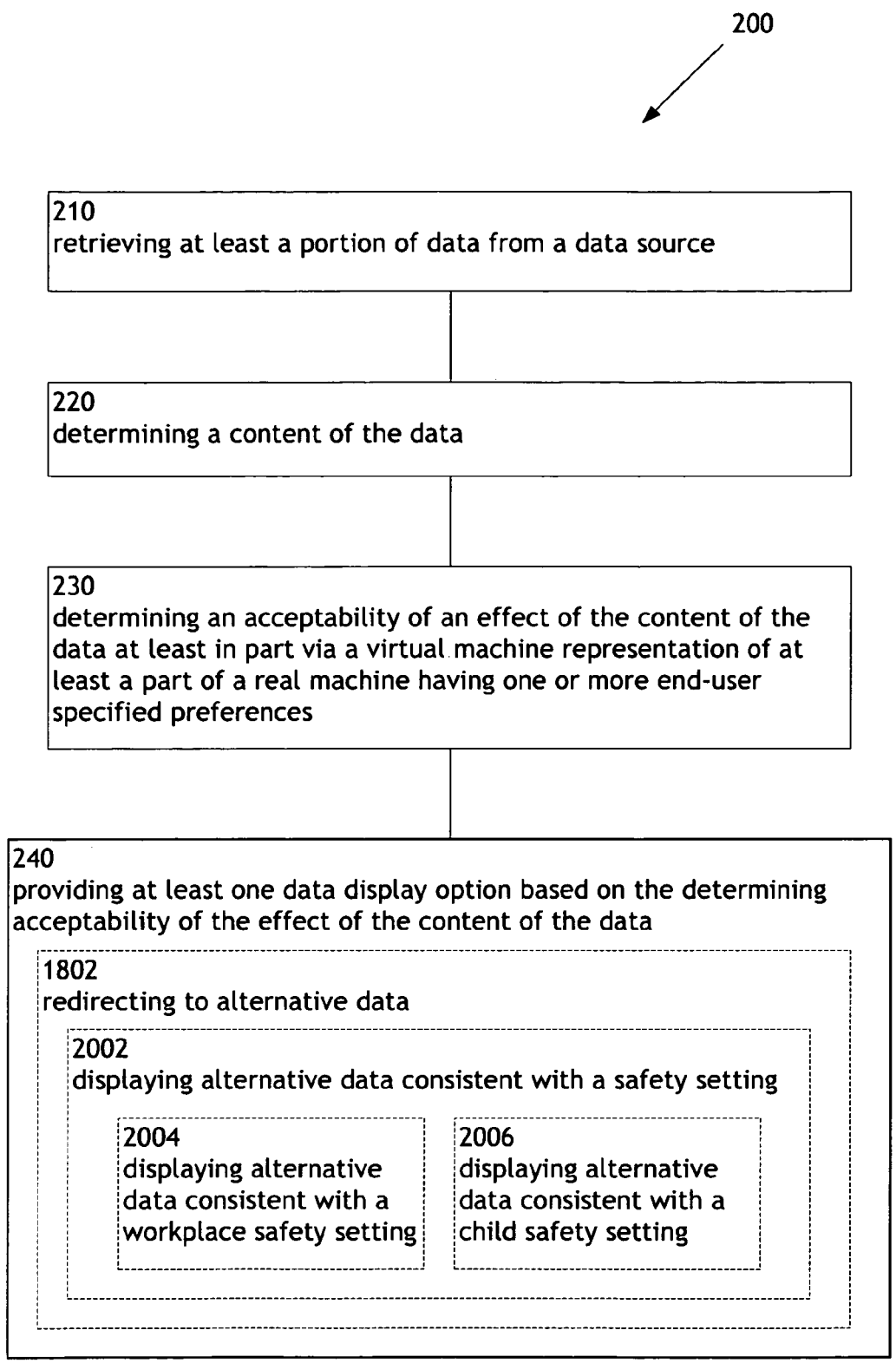
FIG. 20 illustrates an alternative embodiment of the operational flow of FIG. 2.

FIG. 20 illustrates alternative embodiments of the example operational flow 200 of FIG. 2. FIG. 20 illustrates example embodiments where the providing at least one data display option operation 240 may include at least one additional operation. Additional operations may include an operation 2002, an operation 2004, and/or an operation 2006.

Operation 2002 shows displaying alternative data consistent with a safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a safety setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a safety setting stored in a copy of the user preference database 120 (FIG. 1A) spawned on the virtual machine 11, 12 and/or 13. Effect of content acceptability determination engine 106 may communicate the redirect to alternative data consistent with a safety setting instruction to the data content provider engine 108. The data content provider engine 108 may transmit the redirect data instruction to the data redirection engine 128 for redirection to alternative data consistent with a safety setting. The data redirection engine 128 may transmit the redirection to the data content provider engine 108. Data content provider engine 108 may then display the alternative data. Displaying alternative data consistent with a safety setting may include displaying a different webpage including only information consistent with a safety setting such as "do not display links requesting credit card information."

Operation 2004 shows displaying alternative data consistent with a workplace safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a workplace safety setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a workplace safety setting stored in a copy of the user preference database 120 (FIG. 1A) spawned on the virtual machine 11, 12 and/or 13. Effect of content acceptability determination engine 106 may communicate the redirect to alternative data consistent with a workplace safety setting instruction to the data content provider engine 108. The data content provider engine 108 may transmit the redirect data instruction to the data redirection engine 128 for redirection to alternative data consistent with a workplace safety setting. The data redirection engine 128 may transmit the redirection to the data content provider engine 108. Data content provider engine 108 may then display the alternative data. Displaying alternative data consistent with a workplace safety setting may include displaying a different webpage including only information consistent with a workplace safety setting such as "do not display links requesting information on this computer."

Operation 2006 shows displaying alternative data consistent with a child safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a child safety setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a child safety setting stored in a copy of the user preference database 120 (FIG. 1A) spawned on the virtual machine 11, 12 and/or 13. Effect of content acceptability determination engine 106 may communicate the redirect to alternative data consistent with a child safety setting instruction to the data content provider engine 108. The data content provider engine 108 may transmit the redirect data instruction to the data redirection engine 128 for redirection to alternative data consistent with a child safety setting. The data redirection engine 128 may transmit the redirection to the data content provider engine 108. Data content provider engine 108 may then display the alternative data. Displaying alternative data consistent with a child safety setting may include displaying a different webpage including only information consistent with a child safety setting such as "do not display links containing trailers for rated 'R' movies."

Figure 21:
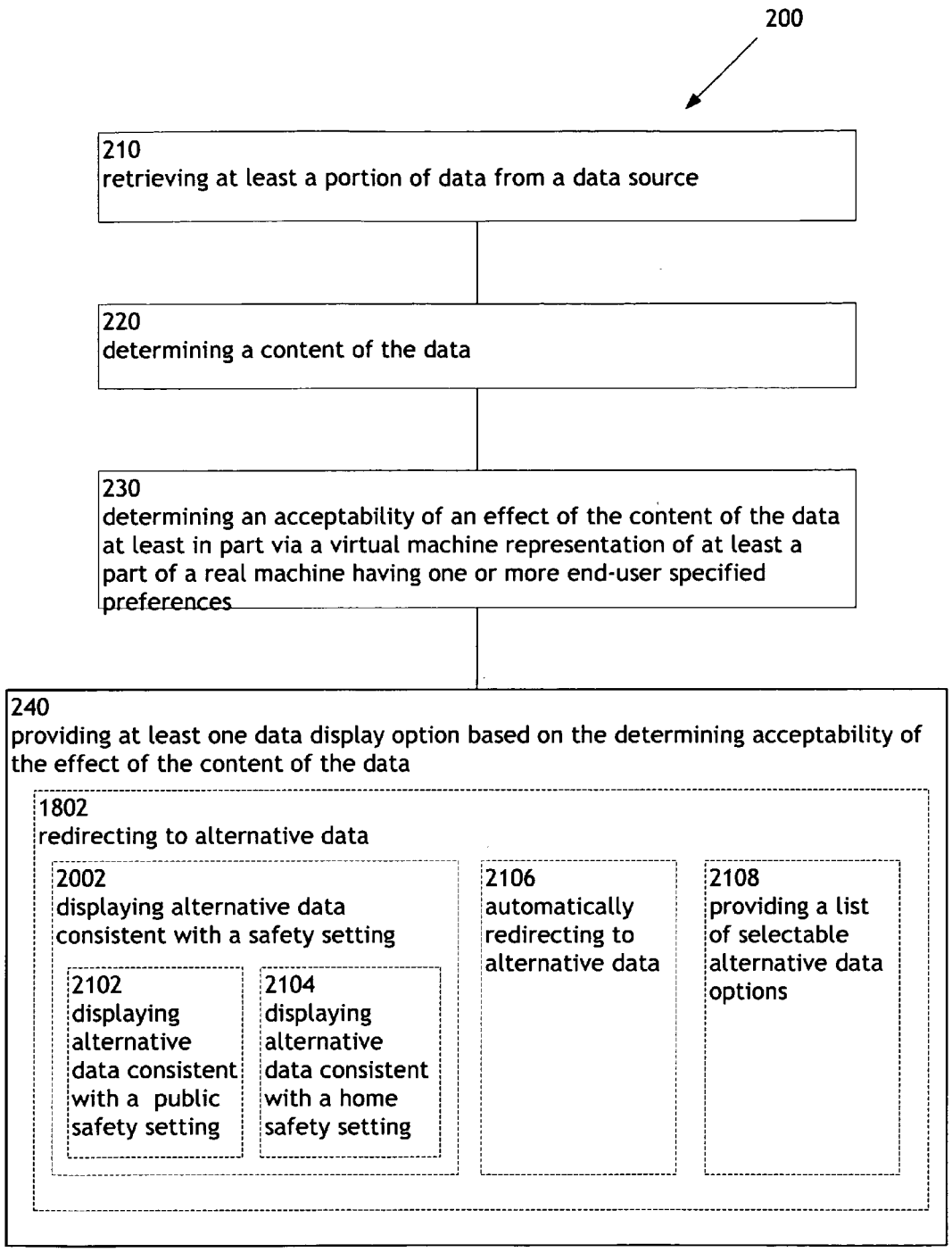
FIG. 21 illustrates an alternative embodiment of the operational flow of FIG. 2.

FIG. 21 illustrates alternative embodiments of the example operational flow 200 of FIG. 2. FIG. 21 illustrates example embodiments where the providing at least one data display option operation 240 may include at least one additional operation. Additional operations may include an operation 2102, an operation 2104, an operation 2106, and/or an operation 2108.

Operation 2102 shows displaying alternative data consistent with a public safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a public safety setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a public safety setting stored in a copy of the user preference database 120 (FIG. 1A) spawned on the virtual machine 11, 12 and/or 13. Effect of content acceptability determination engine 106 may communicate the redirect to alternative data consistent with a public safety setting instruction to the data content provider engine 108. The data content provider engine 108 may transmit the redirect data instruction to the data redirection engine 128 for redirection to alternative data consistent with a public safety setting. The data redirection engine 128 may transmit the redirection to the data content provider engine 108. Data content provider engine 108 may then display the alternative data. Displaying alternative data consistent with a public safety setting may include displaying a different webpage including only information consistent with a public safety setting such as "display only non-confidential data." Public safety setting may include a transmittable information safety setting, a viewable information safety setting and a receivable information safety setting. Transmittable or viewable information may be private user information, such as credit card numbers, bank accounts, personal identification information or any other personal user information. Receivable information may be any information such as text, images, a virus, spyware, or any other information that a user's real machine may be capable of receiving from an external source.

Operation 2104 shows displaying alternative data consistent with a home safety setting. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data consistent with a home safety setting (e.g. another website). For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a home safety setting stored in a copy of the user preference database 120 (FIG. 1A) spawned on the virtual machine 11, 12 and/or 13. Effect of content acceptability determination engine 106 may communicate the redirect to alternative data consistent with a home safety setting instruction to the data content provider engine 108. The data content provider engine 108 may transmit the redirect data instruction to the data redirection engine 128 for redirection to alternative data consistent with a home safety setting. The data redirection engine 128 may transmit the redirection to the data content provider engine 108. Data content provider engine 108 may then display the alternative data. Displaying alternative data consistent with a home safety setting may include displaying a different webpage including only information consistent with a home safety setting such as "do not display links requesting address information."

Operation 2106 shows automatically redirecting to alternative data. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of redirecting to alternative data (e.g. another website) consistent with a user preference. For instance, data content provider engine 108 may receive at least one redirect instruction from at least one component of Effect of content acceptability determination engine 106 (FIG. 1A). Each of virtual machines 11, 12 and/or 13 may include one or more instruction generating modules configured to provide a redirect instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the redirect to alternative data consistent with the user preference instruction to the data content provider engine 108. The data content provider engine 108 may transmit the redirect data instruction to the data redirection engine 128 for redirection to alternative data consistent with the user preference. The data redirection engine 128 may transmit the redirection to the data content provider engine 108. Data content provider engine 108 may then automatically (e.g. prior to alerting a user) display the alternative data. For instance, a real machine 130 may be automatically redirected to an acceptable web link, or a page of acceptable data.

Further, operation 2108 shows providing a list of selectable alternative data options. Continuing the example above, data provider engine 108 (FIG. 1A) may be in communication with Effect of content acceptability determination engine 106 (FIG. 1A), which may receive data and an associated data content determination from data content determination engine 104 (FIG. 1A) post retrieval of data by data retriever engine 102 (FIG. 1A). Effect of content acceptability determination engine 106 may transfer effect of content acceptability determination to the data provider engine 108 to provide the data display option of providing a list of selectable alternative data options (e.g. a list of alternative websites) consistent with a user preference. For instance, data content provider engine 108 may receive at least one provide selectable alternatives instruction from at least one component of Effect of content acceptability determination engine 106 (FIG. 1A). Each of virtual machines 11, 12 and/or 13 may include one or more instruction generating modules configured to transmit a provide selectable alternatives instruction to the Effect of content acceptability determination engine 106 after a comparison of an activation of a link to a user preference stored in a copy of the user preference database 120 (FIG. 1A) spawned on the virtual machine 11, 12 and/or 13. Effect of content acceptability determination engine 106 may communicate the provide selectable alternatives instruction to the data content provider engine 108. The data content provider engine 108 may transmit the provide selectable alternatives instruction to the data redirection engine 128 to provide selectable alternatives consistent with the user preference. The data redirection engine 128 may transmit the list of selectable alternatives to the data content provider engine 108. Data content provider engine 108 may then display the list of selectable alternatives. For instance, the list of selectable alternative data options may include a list of acceptable web links or a selectable list of web pages. Selectable web links and web pages may include a thumbnail image of the first page of the web link or of the web page.

Figure 22:
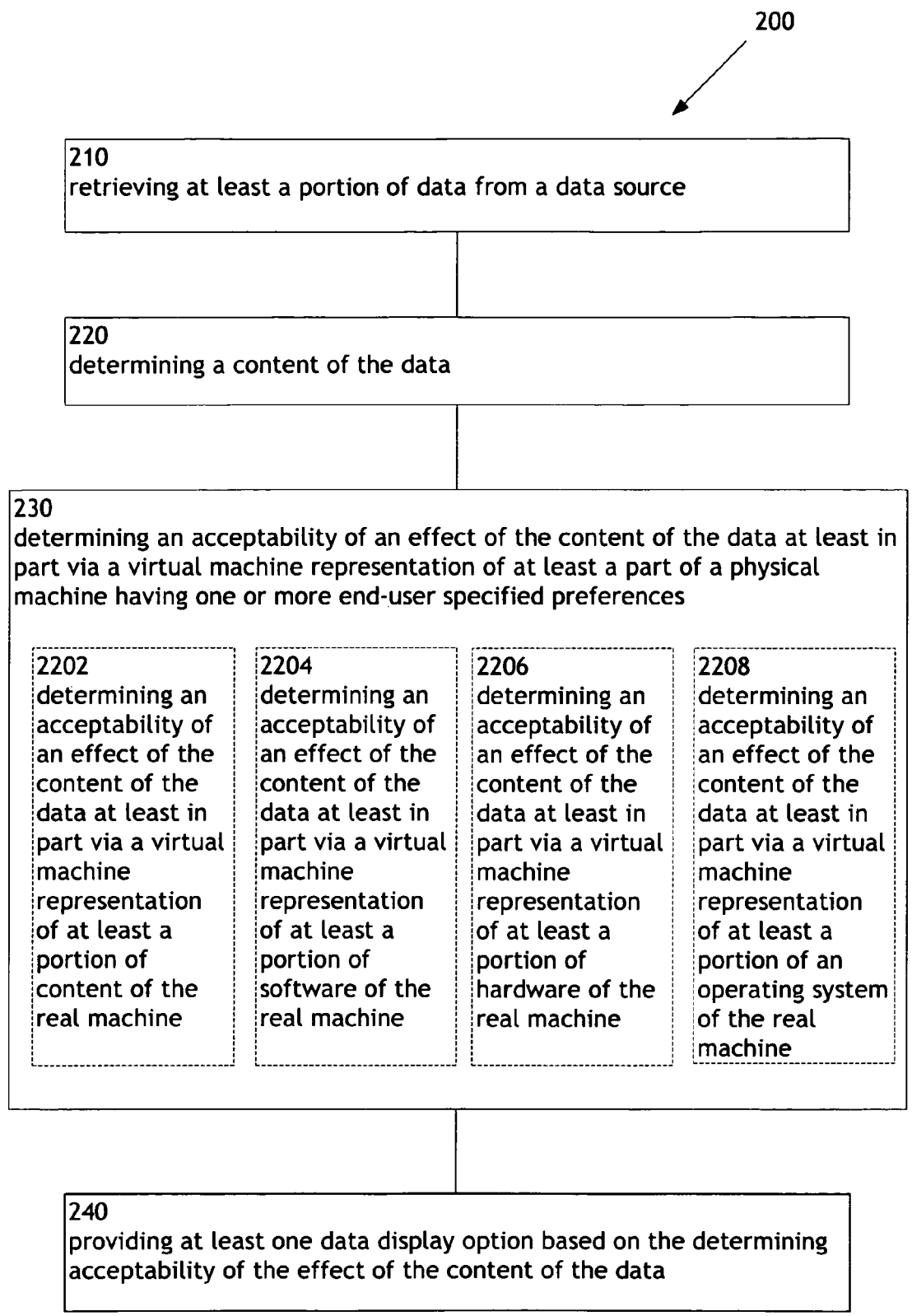
FIG. 22 illustrates an alternative embodiment of the operational flow of FIG. 2.

FIG. 22 illustrates alternative embodiments of the example operational flow 200 of FIG. 2. FIG. 22 illustrates example embodiments where the providing at least one data display option operation 230 may include at least one additional operation. Additional operations may include an operation 2202, an operation 2204, an operation 2206, and/or an operation 2208.

At the operation 2202, the determining an acceptability of an effect of the content of the data at least in part via a virtual machine representation includes determining an acceptability of an effect of the content of the data at least in part via a virtual machine representation of at least a portion of the content of the real machine. Continuing the example above, FIG. 1A shows the Effect of content acceptability determination engine 106. Effect of content acceptability determination engine 106 may receive a data content determination from data content determination engine 104 post retrieval of data by data retriever engine 102. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13 encompassing a virtual machine representation of real machine 130, post (e.g. subsequent to) activation of Link 1, Link 2, and Link 3, respectively (e.g., as at least a part of real machine 130 would exist had link 1, link 2, and/or link 3 actually been traversed on real machine 130). FIG. 1B further depicts virtual machines 11, 12 and/or 13 including a virtual machine representation of content of the real machine 130 post activation of Link 1, Link 2, and/or Link 3, respectively. Examples of such content include a movie, music file, a script (e.g., Java script or Active X control), a markup language, an email, etc. downloaded onto real machine 130 from one or more sources associated with activation/traversal of Link 1, Link 2, and/or Link 3. An example of determining an acceptability of an effect of the content of the data at least in part via a virtual machine representation may include determining an acceptability of an effect of the content of the data at least in part via a virtual machine representation of at least a portion of the content of the real machine include determining whether or not a video or image has been loaded onto, for example, the virtual machine 11 after loading at least a portion of the data contained in Link 1.

Determining an acceptability of an effect of the content of the data at least in part via a virtual machine representation includes determining an acceptability of an effect of the content of the data at least in part via a virtual machine representation of at least a portion of the content of the real machine may also include determining an acceptability of an effect of the content of the data at least in part via a virtual machine representation includes determining an acceptability of an effect of the content of the data at least in part via a virtual machine representation of at least a portion of the content of the real machine on a virtual machine representation of at least a portion of a real machine generated by, for example, virtual machine 11. FIG. 1C shows a partial follow-on operational view of real machine 130 (e.g., a desktop, notebook, or other type computing system) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1.

In some instances, system 100 may use additional virtual machine representations of at least a part of real machine 130 to prospectively traverse Link 4, Link 5, and Link 6 post traversal of Link 1. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. 1C depicts system 100 traversing Links 4, 5, and/or 6 via a virtual machine representation of real machine 130 encompassed within virtual machines 21, 22 and/or 23. Accordingly, FIG. 1C illustrates virtual machine 21 including a virtual machine representation of content (e.g., a movie, web page, music file, etc.) of the real machine 130 post sequential activation of Link 1 then Link 4, virtual machine 22 including a virtual machine representation of content (e.g. a graphical image, a text file, an email, etc) of the real machine 130 post (e.g., subsequent to) sequential activation of Link 1 then Link 5, and virtual machine 23 encompassing a virtual machine representation of the content (e.g. a music file) of the real machine 130 post sequential activation of Link 1 then Link 6. A determination of an acceptability of an effect of the content of data on the content of the real machine made on virtual machine 21 may include determining whether or not an audio file has been loaded onto virtual machine 21. Virtual machine 21 may communicate a determination of an acceptability of an effect of the content of data determination made on a virtual machine 21 which may be at least a portion of content of the real machine to virtual machine 11, which may communicate the acceptability of an effect of the content of data determination to the virtual machine module 118 (FIG. 1A) for communication to the Effect of content acceptability determination engine 106 (FIG. 1A).

At the operation 2204, the determining an acceptability of an effect of the content of the data at least in part via a virtual machine representation includes determining an acceptability of an effect of the content of the data at least in part via a virtual machine representation of at least a portion of the software of the real machine. Continuing the example above, FIG. 1A shows the Effect of content acceptability determination engine 106. Effect of content acceptability determination engine 106 may receive a data content determination from data content determination engine 104 post retrieval of data by data retriever engine 102. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13 encompassing a virtual machine representation of real machine 130, post (e.g. subsequent to) activation of Link 1, Link 2, and Link 3, respectively (e.g., as at least a part of real machine 130 would exist had link 1, link 2, and/or link 3 actually been traversed on real machine 130). FIG. 1B illustrates virtual machine 11 including a virtual machine representation of software (e.g., a state of software) of the real machine 130 post (e.g. subsequent to) activation of Link 1. Examples of such software might include a commercial word processing program or suite of programs (e.g. Microsoft® Office for Windows), an open source Web browser (e.g., Mozilla's Firefox® Browser), an AJAX mash up (e.g., an executing JavaScript™ and/or data retrieved by same via an XML-like scheme), or a commercial database management system (e.g., one or more of Oracle Corporation's various products), a commercial anti-malware/spyware programs (e.g., such as those of Symantec Corporation or McAfee,Inc.), etc. An example of determining an acceptability of an effect of the content of the data at least in part via a virtual machine representation may include determining an acceptability of an effect of the content of the data at least in part via a virtual machine representation of at least a portion of the software of the real machine include determining whether or not an unauthorized program or suite of programs (e.g. music downloading software) has been loaded, for example, onto virtual machine 12 after loading at least a portion of the data contained in Link 2.

Determining an acceptability of an effect of the content of the data at least in part via a virtual machine representation includes determining an acceptability of an effect of the content of the data at least in part via a virtual machine representation of at least a portion of the software of the real machine may also include determining an acceptability of an effect of the content of the data at least in part via a virtual machine representation includes determining an acceptability of an effect of the content of the data at least in part via a virtual machine representation of at least a portion of the software of the real machine on a virtual machine representation of at least a portion of the software of a real machine generated by, for example, virtual machine 11. FIG. 1C shows a partial follow-on operational view of real machine 130 (e.g., a desktop, notebook, or other type computing system) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1.

In some instances, system 100 may use additional virtual machine representations of at least a part of real machine 130 to prospectively traverse Link 4, Link 5, and Link 6. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. 1C depicts system 100 traversing Links 4, 5, and/or 6 via a virtual machine representation of real machine 130 encompassed within virtual machines 21, 22 and/or 23. Accordingly, FIG. 1C illustrates virtual machine 21 including a virtual machine representation of the software (e.g.) of the real machine 130 post sequential activation of Link 1 then Link 4, virtual machine 22 including a virtual machine representation of software (e.g. an AJAX mashup) of the real machine 130 post sequential activation of Link 1 then Link 5, and a virtual machine representation of the software (e.g. a commercial database management system) of the real machine 130 post sequential activation of Link 1 then Link 6. A determination of an acceptability of an effect of the content of data on the software of the real machine made on virtual machine 21 may include determining whether or not malware or grayware has been loaded onto virtual machine 21. Virtual machine 21 may communicate a determination of acceptability of an effect of the content of data on a virtual machine representation of at least a portion of software of the real machine made on virtual machine 21 to virtual machine 11, which may communicate the acceptability of an effect of the content of data determination to the virtual machine module 118 (FIG. 1A) for communication to the Effect of content acceptability determination engine 106 (FIG. 1A).

At the operation 2206, the determining an acceptability of an effect of the content of the data at least in part via a virtual machine representation includes determining an acceptability of an effect of the content of the data at least in part via a virtual machine representation of at least a portion of the hardware of the real machine. Continuing the example above, FIG. 1A shows the Effect of content acceptability determination engine 106. Effect of content acceptability determination engine 106 may receive a data content determination from data content determination engine 104 post retrieval of data by data retriever engine 102. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12 and/or 13. FIG. 1B shows virtual machines 11, 12 and/or 13 encompassing a virtual machine representation of real machine 130, post (e.g. subsequent to) activation of Link 1, Link 2, and Link 3, respectively (e.g., as at least a part of real machine 130 would exist had link 1, link 2 or link 3 actually been traversed on real machine 130). FIG. 1B illustrates virtual machine 11 including a virtual machine representation of hardware (e.g. a state of the hardware) of the real machine 130 post activation of Link 1. Examples of such hardware might include all or part of a chipset (e.g., data processor and/or graphics processor chipsets such as those of Intel Corporation and/or NvidiaCorporation), a memory chip (e.g., flash memory and/or random access memories such as those of Sandisk Corporation and/or Samsung Electronics, Co., LTD), a data bus, a hard disk (e.g., such as those of Seagate Technology, LLC), a network adapter (e.g., wireless and/or wired LAN adapters such as those of Linksys and/or CiscoTechnology, Inc.), printer, a removable drive (e.g., flash drive), a cell phone, etc. An example of determining an acceptability of an effect of the content of the data at least in part via a virtual machine representation includes determining an acceptability of an effect of the content of the data at least in part via a virtual machine representation of at least a portion of the hardware of the real machine include determining whether a network adapter on, for example, virtual machine 12 has been disabled after loading at least a portion of the data contained in Link 2.

Determining an acceptability of an effect of the content of the data at least in part via a virtual machine representation includes determining an acceptability of an effect of the content of the data at least in part via a virtual machine representation of at least a portion of the hardware of the real machine may also include determining an acceptability of an effect of the content of the data at least in part via a virtual machine representation includes determining an acceptability of an effect of the content of the data at least in part via a virtual machine representation of at least a portion of the hardware of the real machine on a virtual machine representation of at least a portion of the hardware of a real machine generated by, for example, virtual machine 11. FIG. 1C shows a partial follow-on operational view of real machine 130 (e.g., a desktop, notebook, or other type computing system) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1.

In some instances, system 100 may use additional virtual machine representations of at least a part of real machine 130 to prospectively traverse Link 4, Link 5, and Link 6. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. 1C depicts system 100 traversing Links 4, 5, and/or 6 via a virtual machine representation of real machine 130 encompassed within virtual machines 21, 22 and/or 23. Accordingly, FIG. 1C illustrates virtual machine 21 including a virtual machine representation of the hardware (e.g. the circuitry or processor of the real machine) of the real machine 130 post sequential activation of Link 1 then Link 4, a virtual machine representation of hardware (e.g. a network adapter) of the real machine 130 post sequential activation of Link 1 then Link 5, and a virtual machine representation of the hardware (e.g. a removable drive) of the real machine 130 post sequential activation of Link 1 then Link 6. A determination of an acceptability of an effect of the content of data on the hardware of the real machine made on virtual machine 21 may include determining whether a decrease in processor speed of virtual machine 21 has occurred. Virtual machine 21 may communicate a determination of acceptability of an effect of the content of data on a virtual machine representation of at least a portion of hardware of the real machine made on virtual machine 21 to virtual machine 11, which may communicate the acceptability of an effect of the content of data determination to the virtual machine module 118 (FIG. 1A) for communication to the Effect of content acceptability determination engine 106 (FIG. 1A).

At the operation 2208, the determining an acceptability of an effect of the content of the data at least in part via a virtual machine representation includes determining an acceptability of an effect of the content of the data at least in part via a virtual machine representation of at least a portion of the operating system of the real machine. Continuing the example above, FIG. 1A shows the Effect of content acceptability determination engine 106. Effect of content acceptability determination engine 106 may receive a data content determination from data content determination engine 104 post retrieval of data by data retriever engine 102. FIG. 1A further illustrates the Effect of content acceptability determination engine 106 further including a virtual machine module 118 and a user preference database 120. Virtual machine module 118 includes virtual machines 11, 12 and/or 13. Effect of content acceptability determination engine 106 may transfer data received from data content determination engine 104 following a determination of data content. Effect of content acceptability determination engine 106 may transfer the data and associated data content determination to the virtual machine module 118. Virtual machine module 118 (FIG. 1A) may spawn at least one virtual machine 11, 12, and/or 13 and transfer the data and associated data content determination to at least one of virtual machines 11, 12, and/or 13. FIG. 1B shows virtual machines 11, 12 and/or 13 encompassing a virtual machine representation of real machine 130, post (e.g. subsequent to) activation of Link 1, Link 2, and Link 3, respectively (e.g., as at least a part of real machine 130 would exist had link 1, link 2, and/or link 3 actually been traversed on real machine 130). FIG. 1B also illustrates virtual machine 11 including a virtual machine representation of an operating system (e.g., a state of an operating system and/or network operating system) of the real machine 130 post activation of Link 1. Examples of such an operating system might include a computer operating system (e.g., e.g. Microsoft® Windows 2000, Unix, Linux, etc) and/or a network operating system (e.g., the Internet Operating System available from Cisco Technology, Inc. Netware® available from Novell, Inc., and/or Solaris available from Sun Microsystems, Inc.). An example of determining an acceptability of an effect of the content of the data at least in part via a virtual machine representation includes determining an acceptability of an effect of the content of the data at least in part via a virtual machine representation of at least a portion of an operating system of the real machine include determining whether a portion of the operating system (e.g. Microsft Vista) on for example, virtual machine 12 has been disabled after loading at least a portion of the data contained in Link 2.

Determining an acceptability of an effect of the content of the data at least in part via a virtual machine representation includes determining an acceptability of an effect of the content of the data at least in part via a virtual machine representation of at least a portion of the operating system of the real machine may also include determining an acceptability of an effect of the content of the data at least in part via a virtual machine representation includes determining an acceptability of an effect of the content of the data at least in part via a virtual machine representation of at least a portion of the operating system of the real machine on a virtual machine representation of at least a portion of the operating system of a real machine generated by, for example, virtual machine 11. FIG. 1C shows a partial follow-on operational view of real machine 130 (e.g., a desktop, notebook, or other type computing system) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1.

In some instances, system 100 may use additional virtual machine representations of at least a part of real machine 130 to prospectively traverse Link 4, Link 5, and Link 6. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. 1C depicts system 100 traversing Links 4, 5, and/or 6 via a virtual machine representation of real machine 130 encompassed within virtual machines 21, 22 and/or 23. Accordingly, FIG. 1C illustrates virtual machine 21 including a virtual machine representation of the operating system (e.g. Linux) of the real machine 130 post sequential activation of Link 1 then Link 4, a virtual machine representation of an operating system (e.g. Mac OS/X) of the real machine 130 post sequential activation of Link 1 then Link 5, and a virtual machine representation of the operating system (e.g. GNU, Berkeley Software Distribution) of the real machine 130 post sequential activation of Link 1 then Link 6 (e.g., as such might appear after activation of a link installed by a rootkit via malware/spyware). A determination of an acceptability of an effect of the content of data on the operating system of the real machine made on virtual machine 21 may include determining whether or not a rootkit has been installed onto virtual machine 21. Virtual machine 21 may communicate a determination of acceptability of an effect of the content of data on a virtual machine representation of at least a portion of operating system of the real machine made on virtual machine 21 to virtual machine 11, which may communicate the acceptability of an effect of the content of data determination to the virtual machine module 118 (FIG. 1A) for communication to the Effect of content acceptability determination engine 106 (FIG. 1A).

Figure 23:
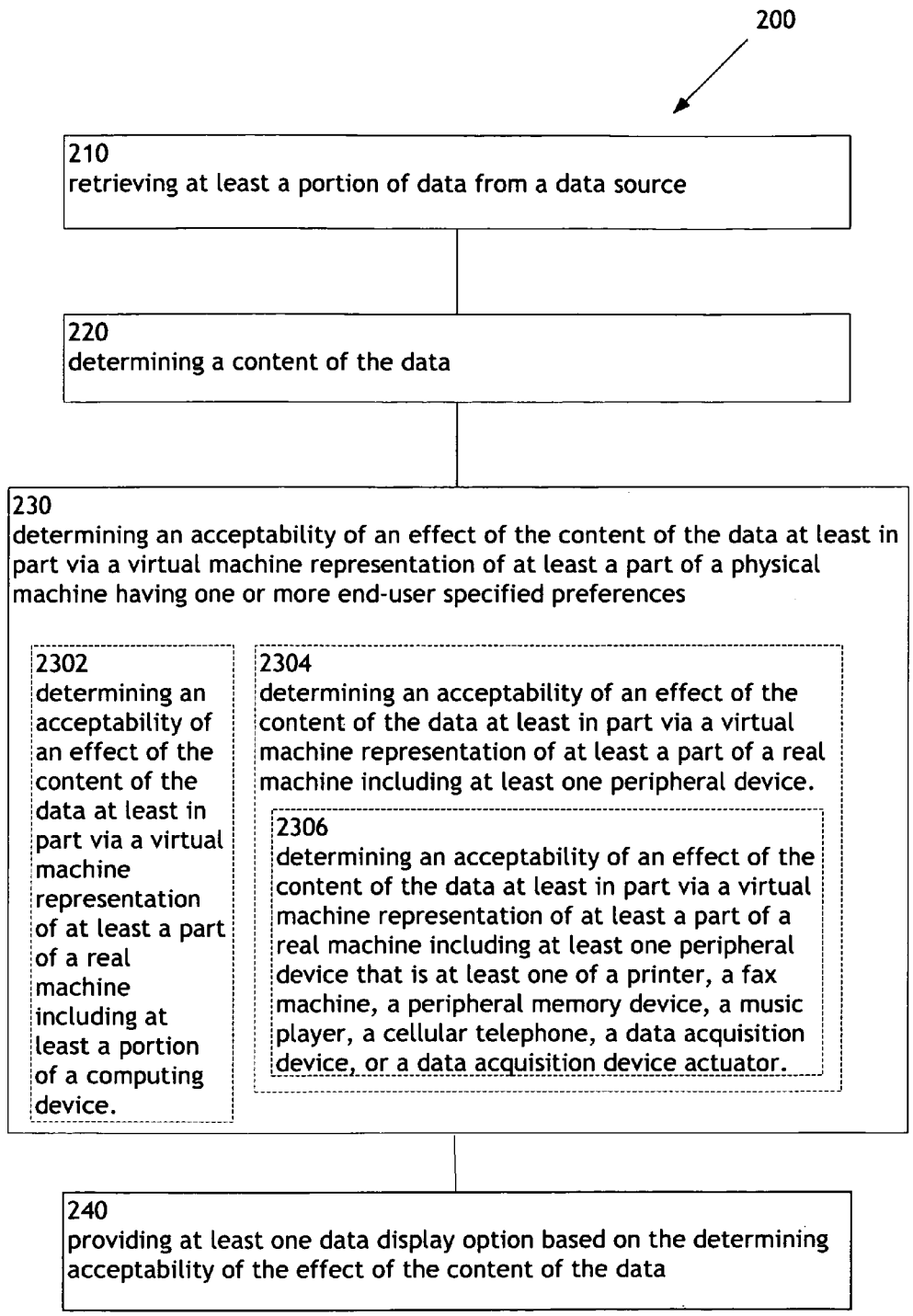
FIG. 23 illustrates an alternative embodiment of the operational flow of FIG. 2.

FIG. 23 illustrates alternative embodiments of the example operational flow 200 of FIG. 2. FIG. 23 illustrates example embodiments where the providing at least one data display option operation 230 may include at least one additional operation. Additional operations may include an operation 2302, an operation 2304, and/or an operation 2306.

At the operation 2302, the determining an acceptability of an effect of the content of the data at least in part via a virtual machine representation of at least a part of a real machine having one or more end-user specified preferences includes determining an acceptability of an effect of the content of the data at least in part via a virtual machine representation of at least a part of a real machine including at least a part of a computing device. FIG. 1D illustrates real machine 130 including at least a part of a computing device 132. The computing device 132 may be any device capable of processing one or more programming instructions. For example, the computing device 132 may be a desktop computer, a laptop computer, a notebook computer, a mobile phone, a personal digital assistant (PDA), combinations thereof, and/or other suitable computing devices.

At the operation 2304, the determining an acceptability of an effect of the content of the data at least in part via a virtual machine representation of at least a part of a real machine having one or more end-user specified preferences includes determining an acceptability of an effect of the content of the data at least in part via a virtual machine representation of at least a part of a real machine including at least one peripheral device. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 may spawn virtual machines 11, 12 and/or 13 that may be virtual machine representations of at least a part of real machine 130. Real machine 130 may include at least one peripheral device. For instance, FIG. 1D illustrates real machine 130 including at least one peripheral device 134-146. FIG. 1D shows a representative view of an implementation of real machine 130 (e.g., a desktop, notebook, or other type computing system, and/or one or more peripheral devices) in which all/part of system 100 may be implemented. FIG. 1D illustrates that implementations of real machine 130 may include all/part of computing device 132 and/or all/part of one or one or more peripherals associated computing device 132.

At the operation 2306, the determining an acceptability of an effect of the content of the data at least in part via a virtual machine representation of at least a part of a real machine having one or more end-user specified preferences includes determining an acceptability of an effect of the content of the data at least in part via a virtual machine representation of at least a part of a real machine including at least one peripheral device includes determining an acceptability of an effect of the content of the data at least in part via a virtual machine representation of at least a part of a real machine having one or more end-user specified preferences includes determining an acceptability of an effect of the content of the data at least in part via a virtual machine representation of at least a part of a real machine including at least one peripheral device that is at least one of a printer, a fax machine, a peripheral memory device, a network adapter, a music player, a cellular telephone, a data acquisition device, or a device actuator. Continuing the example above, FIG. 1A shows the Effect of content acceptability determination engine 106. Effect of content acceptability determination engine 106 may receive a data content determination from data content determination engine 104 post retrieval of data by data retriever engine 102 and communication of retrieved data to data content determination engine 104. FIG. 1A further illustrates the Effect of content acceptability determination engine 106 further including a virtual machine module 118 and a user preference database 120. Virtual machine module 118 may spawn virtual machines 11, 12 and/or 13 that may be virtual machine representations of at least a part of real machine 130. Real machine 130 may include at least one peripheral device. For instance, FIG. 1D illustrates a real machine may also include at least a portion of one or more peripheral devices connected/connectable (e.g., via wired, waveguide, or wireless connections) to real machine 130. Peripheral devices may include one or more printers 134, one or more fax machines 136, one or more peripheral memory devices 138 (e.g., flash drive, memory stick), one or more network adapters 139 (e.g., wired or wireless network adapters), one or more music players 140, one or more cellular telephones 142, one or more data acquisition devices 144 (e.g. robots) and/or one or more device actuators 146 (e.g., an hydraulic arm, a radiation emitter, or any other component(s) of industrial/medical systems).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A system comprising:
a data retriever engine configured to retrieve data content;
a data content determination engine configured to provide a virtual machine representation of at least one piece of hardware of an end user's real machine had the data content been received by the end user's real machine;
an effect of content acceptability determination engine including circuitry configured to determine an acceptability of an effect of the data content at least in part via a comparison of at least one change resulting from the data content interacting with the virtual machine representation against at least one end-user specified preference of the end-user's real machine; and
a data provider engine including circuitry configured to provide at least one option to the end-user's real machine based on a determination of an acceptability of an effect of the data content.

2. The system of claim 1, wherein the data content determination engine comprises:
a database examination engine.

3. The system of claim 1, wherein the data content determination engine comprises:
a data traverser engine.

4. The system of claim 1, wherein the data content determination engine comprises:
a local data examination engine.

5. The system of claim 1, wherein the effect of content acceptability determination engine comprises:
a user preference database.

6. The system of claim 1, wherein the at least one end-user specified preference of the end user's real machine includes:
at least one user-associated preference relating to content of an end user's real machine.

7. The system of claim 1, wherein the at least one end-user specified preference of the end user's real machine includes:
at least one user-associated preference relating to software of an end user's real machine.

8. The system of claim 1, wherein the at least one end-user specified preference of the end user's real machine includes:
at least one user-associated preference relating to hardware of an end user's real machine.

9. The system of claim 1, wherein the at least one end-user specified preference of the end user's real machine includes:
at least one user-associated preference relating to an operating system of an end user's real machine.

10. The system of claim 1, wherein the effect of content acceptability determination engine comprises:
a virtual machine module.

11. The system of claim 10, wherein the virtual machine module comprises:
a plurality of virtual machines.

12. The system of claim 11, wherein the virtual machine module comprises:
circuitry configured to spawn a copy of at least a portion of the user preference database on at least one of the plurality of virtual machines.

13. The system of claim 10, wherein the virtual machine module comprises:
circuitry configured to compare at least one user-associated preference from a user preference database to a retrieved data portion.

14. The system of claim 1, wherein the data retriever engine comprises:
circuitry configured to retrieve at least a portion of data from a data source.

15. The system of claim 14, wherein the at least a portion of the data content comprises:
at least one of a web page or a web link including at least a portion of a textual representation, a two-dimensional image, a three-dimensional image, an audio file, or a video representation.

16. The system of claim 1, wherein the effect of content acceptability determination engine comprises:
circuitry configured to determine an acceptability of an effect of the content of the data on at least two virtual machine representations of at least a part of an end user's real machine having one or more end-user specified preferences.

17. The system of claim 1, wherein the effect of content acceptability determination engine comprises:
circuitry configured to determine an acceptability of an effect of the content of the data on at least two virtual machine representations of at least a part of an end user's real machine having one or more end-user specified preferences at least one of the at least two virtual machine representations operating on a separate operating system.

18. The system of claim 1, wherein the effect of content acceptability determination engine comprises:
circuitry configured to determine an acceptability of an effect of the content of the data on at least two virtual machine representations of at least a part of an end user's real machine having one or more end-user specified preferences, at least one of the at least two virtual machine representations operating on a separate core of a system including at least two cores.

19. The system of claim 1, wherein the effect of content acceptability determination engine comprises:
circuitry configured to determine a state change of a virtual machine representation between a prior state and a subsequent state of the virtual machine representation after loading at least a portion of data.

20. The system of claim 1, wherein the effect of content acceptability determination engine comprises:
    circuitry configured to determine a state of a virtual machine representation prior to loading at least a portion of data.

21. The system of claim 1, wherein the effect of content acceptability determination engine comprises:
    circuitry configured to determine a state of a virtual machine after loading at least a portion of data.

22. The system of claim 1, wherein the effect of content acceptability determination engine comprises:
    circuitry configured to determine whether a state change is an undesirable state change based on one or more end-user specified preferences.

23. The system of claim 1, wherein the effect of content acceptability determination comprises:
    circuitry configured to determine an acceptability of an effect of the content of the data in response to at least one user setting.

24. The system of claim 1, wherein the effect of content acceptability determination engine comprises:
    circuitry configured to determine an acceptability of an effect of the content of the data in response to visually examining a data image.

25. The system of claim 1, wherein the effect of content acceptability determination engine comprises:
    circuitry configured to determine an acceptability of an effect of the content of the data at least in part via a virtual machine representation of at least a portion of the content of an end user's real machine.

26. The system of claim 1, wherein the effect of content acceptability determination engine comprises:
    circuitry configured to determine an acceptability of an effect of the content of the data at least in part via a virtual machine representation of at least a portion of software of an end user's real machine.

27. The system of claim 1, wherein the effect of content acceptability determination engine comprises:
    circuitry configured to determine an acceptability of an effect of the content of the data at least in part via a virtual machine representation of at least a portion of hardware of an end user's real machine.

28. The system of claim 1, wherein the effect of content acceptability determination engine comprises:
    circuitry configured to determine an acceptability of an effect of the content of the data at least in part via a virtual machine representation of at least a portion of an operating system of an end user's real machine.

29. The system of claim 1, wherein the effect of content acceptability determination engine comprises:
    circuitry configured to determine an acceptability of an effect of the content of the data at least in part via a virtual machine representation of at least a part of an end user's real machine including at least a portion of a computing device.

30. The system of claim 1, wherein the effect of content acceptability determination engine comprises:
    circuitry configured to determine an acceptability of an effect of the content of the data at least in part via a virtual machine representation of at least a part of an end user's real machine including at least one peripheral device.

31. The system of claim 1, wherein the effect of content acceptability determination engine comprises:
    circuitry configured to determine an acceptability of an effect of the content of the data at least in part via a virtual machine representation of at least a part of an end user's real machine including at least one peripheral device that is at least one of a printer, a fax machine, a peripheral memory device, a network adapter, a music player, a cellular telephone, a data acquisition device, or a device actuator.

32. The system of claim 1, wherein the data provider engine comprises:
    a data modification engine.

33. The system of claim 32, wherein the data modification engine comprises:
    circuitry configured to display a modified version of data.

34. The system of claim 33, wherein the circuitry configured to display a modified version circuitry configured to remove, alter, or replace an objectionable data portion.

35. The system of claim 33, wherein circuitry configured to display a modified version of data comprises:
    circuitry configured to display a data portion consistent with at least one user-associated preference.

36. The system of claim 32, wherein the data modification engine comprises:
    a data obfuscation engine.

37. The system of claim 36, wherein the data obfuscation engine comprises:
    circuitry configured to obfuscate data prior to displaying data.

38. The system of claim 37, wherein the circuitry configured to obfuscate data prior to displaying data comprises:
    circuitry configured to blur or block an objectionable data portion.

39. The system of claim 32, wherein the data modification engine comprises:
    a data anonymization engine.

40. The system of claim 39, wherein the data anonymization engine comprises:
    circuitry configured to display an anonymized version of data.

41. The system of claim 40, wherein the circuitry configured to display an anonymized version of data comprises:
    circuitry configured to hide, obscure, or replace original identity information of the data.

42. The system of claim 1, wherein the data provider engine comprises:
    a data redirection engine.

43. The system of claim 42, wherein the data redirection engine comprises:
    circuitry configured to redirect a user to data consistent with at least one userassociated preference.

44. The system of claim 42, wherein the data redirection engine comprises:
    circuitry configured to automatically redirect a user to alternative data.

45. The system of claim 42, wherein the data redirection engine comprises:
    circuitry configured to provide a selectable list of one or more data alternatives.

* * * * *

UNITED STATES PATENT AND TRADEMARK OFFICE
CERTIFICATE OF CORRECTION

| | | |
|---|---|---|
| PATENT NO. | : 8,468,440 B2 | Page 1 of 1 |
| APPLICATION NO. | : 12/154436 | |
| DATED | : June 18, 2013 | |
| INVENTOR(S) | : Flake et al. | |

It is certified that error appears in the above-identified patent and that said Letters Patent is hereby corrected as shown below:

In the Claims:

In Column 62, Line 54, Claim 43 please delete text "one userassociated" and replace with --one user-associated--

Signed and Sealed this
Twenty-fourth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,468,440 B2  
APPLICATION NO. : 12/154436  
DATED : June 18, 2013  
INVENTOR(S) : Flake et al.

Page 1 of 1

It is certified that error appears in the above-identified patent and that said Letters Patent is hereby corrected as shown below:

In the Claims

Column 60, Line 19 should read:
-- 12. The system of claim 10, wherein the virtual machine --

Column 60, Line 52 should read:
-- preferences, wherein at least one of the at least two virtual --

Column 60, Line 61 should read:
-- preferences, wherein at least one of the at least two virtual --

Column 61, Line 18 should read:
-- acceptibility determination engine comprises: --

Column 62, Line 21 should read:
-- 35. The System of claim 33, wherein the circuitry configured to --

Signed and Sealed this
Fourteenth Day of June, 2016

Michelle K. Lee
*Director of the United States Patent and Trademark Office*